(12) United States Patent
Chen

(10) Patent No.: US 6,581,206 B2
(45) Date of Patent: *Jun. 17, 2003

(54) COMPUTER PROGRAM LANGUAGE SUBSET VALIDATION

(75) Inventor: Zhiqun Chen, Palo Alto, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,645

(22) Filed: Nov. 12, 1999

(65) Prior Publication Data

US 2002/0170033 A1 Nov. 14, 2002

(51) Int. Cl.$^7$ ................................................ G06F 9/45
(52) U.S. Cl. ........................ 717/143; 717/142; 717/148
(58) Field of Search ........................... 717/8, 126, 139, 717/143, 148, 124, 142, 141

(56) References Cited

U.S. PATENT DOCUMENTS

| | | | | |
|---|---|---|---|---|
| 5,748,964 A | * | 5/1998 | Gosling | 717/126 |
| 5,838,965 A | | 11/1998 | Kavanagh et al. | 395/614 |
| 5,999,731 A | * | 12/1999 | Yellin et al. | 717/126 |
| 6,075,940 A | * | 6/2000 | Gosling | 717/126 |
| 6,128,774 A | * | 10/2000 | Necula et al. | 717/146 |
| 6,157,966 A | * | 12/2000 | Montgomery et al. | 710/8 |
| 6,195,700 B1 | * | 2/2001 | Bender et al. | 709/230 |
| 6,195,774 B1 | * | 2/2001 | Jacobson | 714/727 |
| 6,247,171 B1 | * | 6/2001 | Yellin et al. | 717/126 |
| 6,289,502 B1 | * | 9/2001 | Garland et al. | 717/2 |
| 6,308,317 B1 | * | 10/2001 | Wilkinson et al. | 717/139 |
| 6,385,729 B1 | * | 5/2002 | DiGiorgio et al. | 713/201 |
| 6,402,028 B1 | * | 6/2002 | Graham et al. | 235/380 |
| 6,477,702 B1 | * | 11/2002 | Yellin et al. | 717/126 |

FOREIGN PATENT DOCUMENTS

EP 0 778 522 A2 6/1997 ............. G06F/9/45

OTHER PUBLICATIONS

"The JAVA Virtual Machine Specification", Tim Lindholm et al. The JAVA series, published Sep. 20, 1996.*
Sun Microsystems Announces JAVACARD API, Business Wire, Oct. 1996.*
Sun Microsystems: Sun JAVA Technology lead open worldwide market smart cards, M2 Presswire May 1999.*
Sun Delivers On Vision to Bring JAVA Technology to the Consumer and Embedded Market, Business Wire, Sep. 28, 1999.*
JAVA Card Technology for Smart Cards Architecture and Programmer's Guide , Zhiquen Chen, pp. 11–16, Sun MicroyStems Inc.*
JAVA!, Tim Richey, Chapter 14, Advanced Topics: The JAVA Virtual Machine, pp. 325–346, Sep. 22, 1995.*

(List continued on next page.)

Primary Examiner—Todd Ingberg
(74) Attorney, Agent, or Firm—Thelen Reid & Priest LLP; John P. Schaub

(57) ABSTRACT

Language subset validation includes validating multiple program modules that comprise a program. The program modules include multiple bytecodes defined for a first computer language that is a hardware-dependent subset of a second computer language. The validation includes indicating an error condition for items in the multiple program modules that are not defined for the first computer language, indicating an error condition for items in the multiple program modules that are not supported by an execution environment of the first computer language and indicating an error condition for items in the multiple program modules that are defined for the first computer language but used in a manner inconsistent with the first computer language.

60 Claims, 15 Drawing Sheets

OTHER PUBLICATIONS

JAVA CARD API 2.0 Specification Finalized, Industry Embraces Java Card for Creation of Next Generation Smart Card Applications pp. 1 and 2, published Oct. 16, 1997, Sun Microsystems Press.*

Sun Microsystems, Inc., "Java Card™ Developer's Guide", Aug. 19, 1998, Revision 1.12.

Sun Microsystems, Inc., Java Card™ 2.0 Application Programming Interfaces, Oct. 13, 1997, Revision 1.0 Final.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

Sun Microsystems, Inc., "Java Card™ 2.1 Application Programming Interface", Jun. 7, 1999, Final Revision 1.1.

Sun Microsystems, Inc., "Java Card™ 2.1 Runtime Environment (JCRE) Specification", Jun. 7, 1999, Final Revision 1.1.

Sun Microsystems, Inc., Java Card™ 2.1 Virtual Machine Specification, Jun. 7, 1999, Final Revision 1.1.

Sun Microsystems, Inc., "Release Notes—Java Card™ 2.1 Specifications", Jun. 7, 1999, Final Revision 1.1.

Sun Microsystems, Inc., "JavaCheck™ 3.0 Frequently Asked Questions", printed from http://java.sun.com/products/personaljava/jcheckfaq30–beta.html, on Dec. 3, 1999.

Sun Microsystems, Inc., "JavaCheck™ Technical Notice", printed from http://java.sun.com/products/personaljava/JCheckTechNotice.html, on Dec. 3, 1999.

Sun Microsystems, Inc., "Using JavaCheck™", Version 2.0.1, printed from www.sun.com/software/personaljava/techinfo.html, on Dec. 3, 1999.

Sun Microsystems, Inc., "Using JavaCheck™", Version 3.0, printed from http://java.sun.com/cgi–bin/download2.cgi, on Dec. 3, 1999.

Sun Microsystems, Inc., "The K Virtual Machine (KVM)", White Paper, Jun. 8, 1999.

* cited by examiner

COMPUTER PROGRAM LANGUAGE SUBSET VALIDATION

CROSS REFERENCE TO RELATED APPLICATIONS

This application is related to the following:

U.S. patent application filed Feb. 2, 1999, Susser and Schwabe, entitled OBJECT-ORIENTED INSTRUCTION SET FOR RESOURCE-CONSTRAINED DEVICES.

U.S. patent application filed Apr. 15, 1997, Levy and Schwabe, entitled VIRTUAL MACHINE WITH SECURELY DISTRIBUTED BYTECODE VERIFICATION.

U.S. patent application filed Nov. 12, 1999, Chen and Schwabe, entitled OPTIMIZATION OF N-BASE TYPED ARITHMETIC EXPRESSIONS.

BACKGROUND OF THE INVENTION

1. Field of the Invention

The present invention relates to computer systems. More particularly, the present invention relates to language subset validation.

2. Background

Object oriented programming techniques such as those used by the Java™ platform are widely used. The basic unit of object oriented programs is the object which has methods (procedures) and fields (data), herein called members. Objects that share members are grouped into classes. A class defines the shared members of the objects in the class. Each object then is a particular instance of the class to which it belongs. In practice, a class is often used as a template to create multiple objects (multiple instances) with similar features.

One property of classes is encapsulation, which describes the property that the actual implementation of the members within the class is hidden from an outside user, and other classes, except as exposed by an interface. This makes classes suitable for distributed development, for example by different developers at different sites on a network. A complete program can be formed by assembling the classes that are needed, linking them together, and executing the resulting program.

Classes enjoy the property of inheritance. Inheritance is a mechanism that enables one class to inherit all of the members of another class. The class that inherits from another class is called a subclass; the class that provides the attributes is the superclass. Symbolically, this can be written as subclass <=superclass, or superclass=> subclass. The subclass can extend the capabilities of the superclass by adding additional members. The subclass can override a virtual method of the superclass by providing a substitute method with the same name and type.

The members of a class type are fields and methods; these include members inherited from the superclass. The class file also names the superclass. A member can be public, which means that it can be accessed by members of the class that contains its declaration. A member can also be private. A private field of a class is visible only in methods defined within that class. Similarly, a private method may only be invoked by methods within the class. Private members are not visible within subclasses, and are not inherited by subclasses as other members are. A member can also be protected.

An interface type is a type whose members are constants and abstract methods. This type has no implementation, but otherwise unrelated classes can implement it by providing implementations for its abstract methods. Interfaces may have sub-interfaces, just as classes may have subclasses. A sub-interface inherits from its super-interface, and may define new methods and constants as well. Additionally, an interface can extend more than one interface at a time. An interface that extends more than one interface inherits all the abstract methods and constants from each of those interfaces, and may define its own additional methods and constants.

In the Java™ programming language, classes can be grouped and the group can be named; the named group of classes is a package. If a class member is not declared with any of the public, private or protected keywords, then it is visible only within the class that defines it and within classes that are part of the same package. A protected member may be accessed by members of declaring class or from anywhere in the package in which it is declared. The Java™ programming language is described in detail in Gosling, et al., "The Java™ Language Specification", August 1996, Addison-Wesley Longman, Inc.

A virtual machine is an abstract computing machine generated by a software application or sequence of instructions that is executed by a processor. The term "architecture-neutral" refers to programs, such as those written in the Java™ programming language, which can be executed by a virtual machine on a variety of computer platforms having a variety of different computer architectures. Thus, for example, a virtual machine implemented on a Windows™-based personal computer system will execute an application using the same set of instructions as a virtual machine implemented on a UNIX™-based computer system. The result of the platform-independent coding of a virtual machine's sequence of instructions is a stream of one or more bytecodes, each of which is, for example, a one-byte-long numerical code.

The Java™ Virtual Machine is one example of a virtual machine. Compiled code to be executed by the Java™ Virtual Machine is represented using a hardware- and operating system-independent binary format, typically stored in a file, known as the class file format. The class file is designed to handle object oriented structures that can represent programs written in the Java™ programming language, but may also support several other programming languages. The class file format precisely defines the representation of a class or interface, including details such as byte ordering that might be taken for granted in a platform-specific object file format. For the sake of security, the Java™ Virtual Machine imposes strong format and structural constraints on the instructions in a class file. Any language with functionality that can be expressed in terms of a valid class file can be hosted by the Java™ Virtual Machine. The class file is designed to handle object oriented structures that can represent programs written in the Java™ programming language, but may also support several other programming languages. The Java™ Virtual Machine is described in detail in Lindholm, et al., "The Java™ Virtual Machine Specification", April 1999, Addison-Wesley Longman, Inc., Second Edition.

Resource-constrained devices are generally considered to be those that are relatively restricted in memory and/or computing power or speed, as compared to typical desktop computers and the like. Other resource-constrained devices include, by way of example, cellular telephones, boundary scan devices, field programmable devices, personal digital assistants (PDAs) and pagers and other miniature or small footprint devices. The invention can also be used on non-resource constrained devices.

For the purposes of this disclosure, the term "processor" may be used to refer to a physical computer or a virtual machine.

Smart cards, also known as intelligent portable data-carrying cards, are a type of resource-constrained device. Smart cards are made of plastic or metal and have an electronic chip that includes an embedded microprocessor or microcontroller to execute programs and memory to store programs and data. Such devices, which can be about the size of a credit card, have computer chips with 8-bit or 16-bit architectures. Additionally, these devices typically have limited memory capacity. For example, some smart cards have less than one kilo-byte (1K) of random access memory (RAM) as well as limited read only memory (ROM), and/or non-volatile memory such as electrically erasable programmable read only memory (EEPROM).

A Java™ virtual machine executes programs written in the Java™ programming language and is designed for use on desktop computers, which are relatively rich in memory. It would be desirable to write programs that use the full implementation of the Java™ Virtual Machine for execution on resource constrained devices such as smart cards. However, due to the limited architecture and memory of resource-constrained devices such as smart cards, the full Java™ Virtual Machine platform cannot be implemented on such devices. Accordingly, a separate Java Card™ (the smart card that supports the Java™ programming language) technology supports a subset of the Java™ programming language for resource-constrained devices.

Some items supported in Java™ technology are not supported in Java Card™ technology. For example, Java™ technology supports types char, double, float and long, but Java Card™ technology does not. Additionally, some Java™ language features are supported in a limited fashion., Java Card™ technology limits the range of operations of these features to less than that of the Java™ technology. For example, Java™ technology allows arrays having more than one dimension, while the Java Card™ technology allows arrays having only one dimension.

In Java Card™ technology, a Java Card™ converter takes regular class files as input and converts them to a CAP (converted applet) file. The CAP format supports a subset of the class file information. Each CAP file contains all of the classes and interfaces defined in one Java™ package. A CAP file has a compact and optimized format, so that a Java™ package can be efficiently stored and executed on resource-constrained devices. After conversion, the CAP file is installed on the Java Card™ technology enabled device.

The existence of a subset of the Java™ language for Java Card™ technology means that valid Java™ program modules including items not supported by the Java Card™ subset may be created. Execution of these program modules on resource-constrained devices may produce erroneous results. Accordingly, a need exists in the prior art for a method and apparatus for language subset validation that facilitates correct execution of applications on resource-constrained devices.

SUMMARY OF THE INVENTION

A method for language subset validation includes validating multiple program modules that comprise a program. Each of the program modules includes multiple bytecodes defined for a first computer language that is a hardware-dependent subset of a second computer language. The validation includes indicating an error condition for each item in the multiple program modules that is not defined for the first computer language, indicating an error condition for each item in the multiple program modules that is not supported by an execution environment of the first computer language and indicating an error condition for each item in the plurality of program modules that is defined for the first computer language but used in a manner inconsistent with the first computer language. An apparatus for language subset validation includes at least one memory having program instructions and at least one processor configured to use the program instructions to validate multiple program modules that together form a program. The processor is further configured to use the program instructions to indicate an error condition for each item in the multiple program modules that is not defined for the first computer language, indicate an error condition for each item in the multiple program modules that is not supported by an execution environment of the first computer language and indicate an error condition for each item in the plurality of program modules that is defined for the first computer language but used in a manner inconsistent with the first computer language.

DETAILED DESCRIPTION OF SPECIFIC EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to language subset validation. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

Figure 1A:
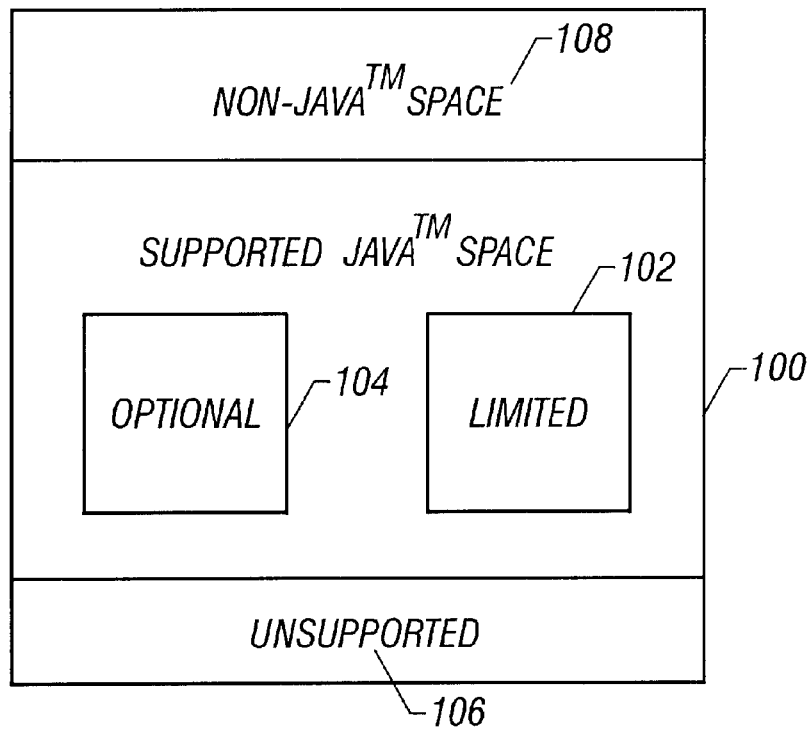
FIG. 1A is a block diagram that illustrates the relationship between a language and a language subset at the source level.
Figure 1B:
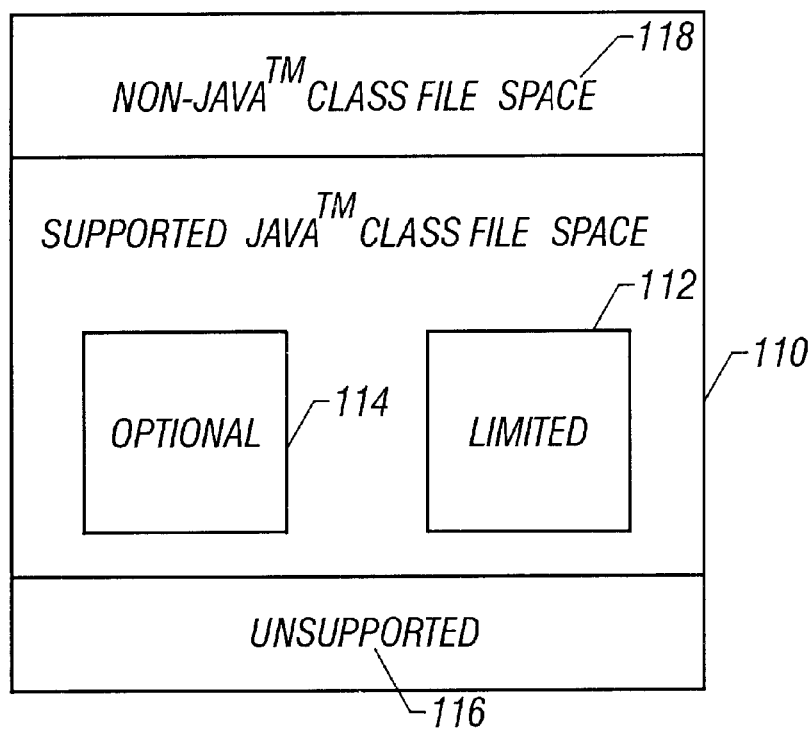
FIG. 1B is a block diagram that illustrates the relationship between a language and a language subset at the class file level.

FIGS. 1A and 1B illustrate the relationship between language and language subset features supported at both the high-level language source and class file levels. Turning now to FIG. 1A, a block diagram that illustrates the relationship between a language and a language subset at the language source level is presented. Java Card™ technology supports a subset of the Java™ language as represented by reference numeral 100. Java Card™ technology also limits the range of operations for some supported Java™ language features, as represented by reference numeral 102. Furthermore, some Java™ features are optionally supported by a particular Java Card™ Virtual Machine. These optional features are represented by reference numeral 104. Features supported by Java™ technology but not supported by Java Card™ technology are represented by reference numeral 106.

Turning now to FIG. 1B, a block diagram that illustrates the relationship between a language and a language subset at the class file level is presented. Java Card™ technology supports a subset of the information contained in a Java™ class file as represented by reference numeral 110. Java Card™ technology also limits the range of operations for some supported Java™ features, and these limitations can be checked at the class file level as represented by reference numeral 112. Furthermore, Java™ features that are optionally supported by a particular Java Card™ Virtual Machine can also be checked at the class file level. These optional features are represented by reference numeral 114. Features supported by Java™ technology but not supported by Java Card™ technology may also be checked at the class file level and are represented by reference numeral 116. Thus, FIG. 1B shows that there is a direct relationship between language features supported at the source level and language features supported at the class file level. Furthermore, by checking at the class file level, it is possible to determine whether programs written at the high level language source level used features that are not defined by the Java Card™ technology.

According to the present invention, instruction-level program files in a system employing a language subset are validated against the language subset. Unsupported items are detected and items that are supported in a limited fashion are checked to determine whether they are used properly. Additionally, the particular execution environment is checked to determine whether it supports optional features. If the execution environment supports optional features, the instruction-level program files are checked to determine whether the optional feature is used properly. If the execution environment does not support optional features, the instruction-level program files are checked to determine whether the unsupported optional features are used. The process proceeds in multiple stages, providing a relatively through validation.

Throughout this disclosure, the invention is illustrated with respect to Java™ technology and Java Card™ technology. However, those of ordinary skill in the art will recognize that the invention is applicable to other platforms as well. Moreover, those of ordinary skill in the art will recognize that the invention may be applied to different types of validation for a language subset.

Figure 2:
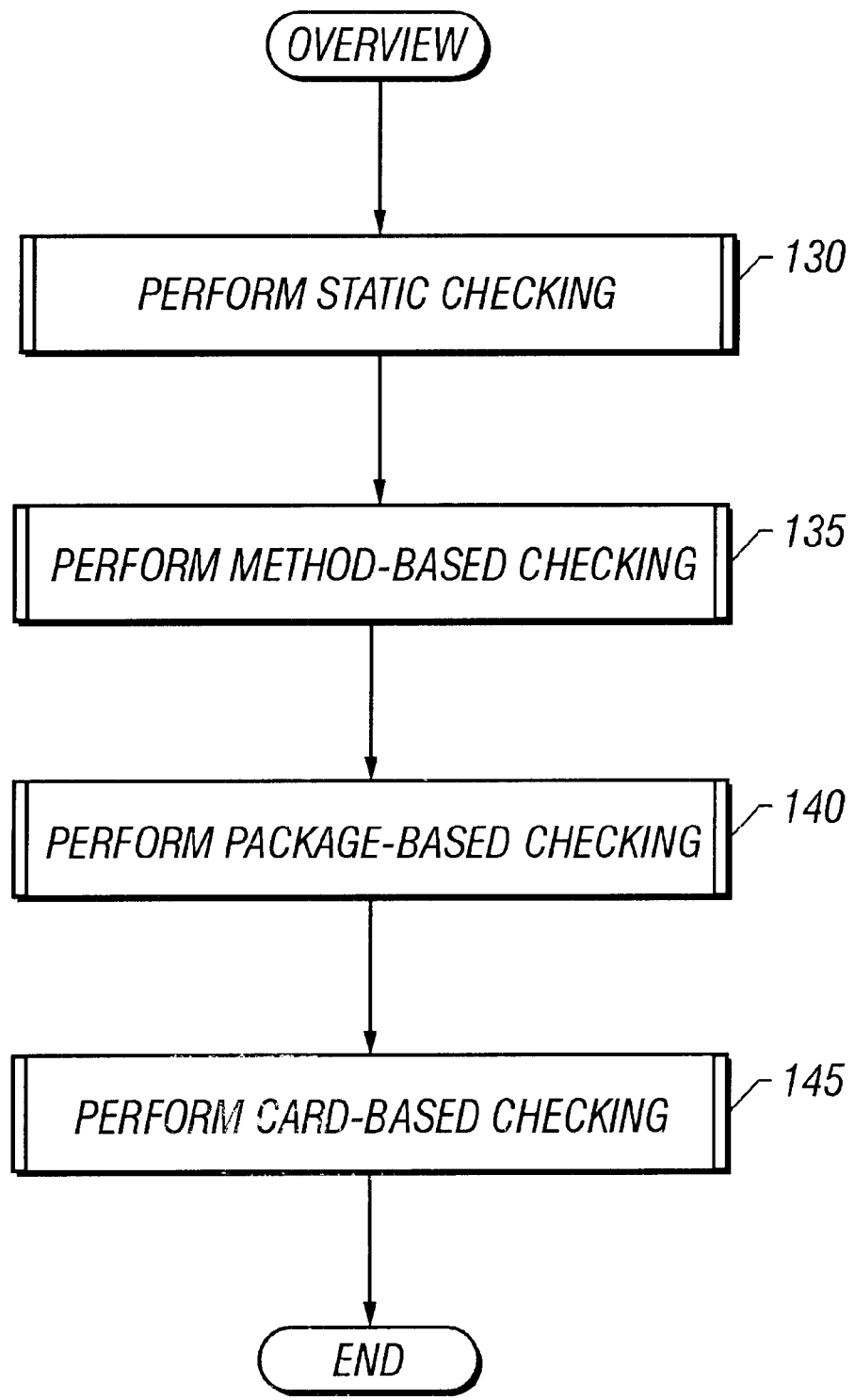
FIG. 2 is a flow diagram that illustrates a method for performing language subset validation in accordance with one embodiment of the present invention.

Turning now to FIG. 2, a method for performing language subset validation in accordance with one embodiment of the present invention is presented. At reference numeral 130, static validation is performed. For the purposes of this disclosure, the term "static validation" refers to validation that may be performed by inspecting class files alone, without reference to other program units or the program execution state. In static validation, unsupported features are detected. In addition, optional features are validated. At reference numeral 135, method-based validation is performed. In method-based validation, data flow analysis is performed on instructions in methods to check intermediate values of arithmetic operations. This stage is used to detect possible overflow conditions. At reference numeral 140, package-based validation is performed. In package-based validation, supported features with limited ranges are detected. At reference numeral 145, card-based validation is performed. In card-based validation, the total amount of memory used by all programs is checked to determine whether the programs exceed the memory constraints of a target device.

Figure 3:
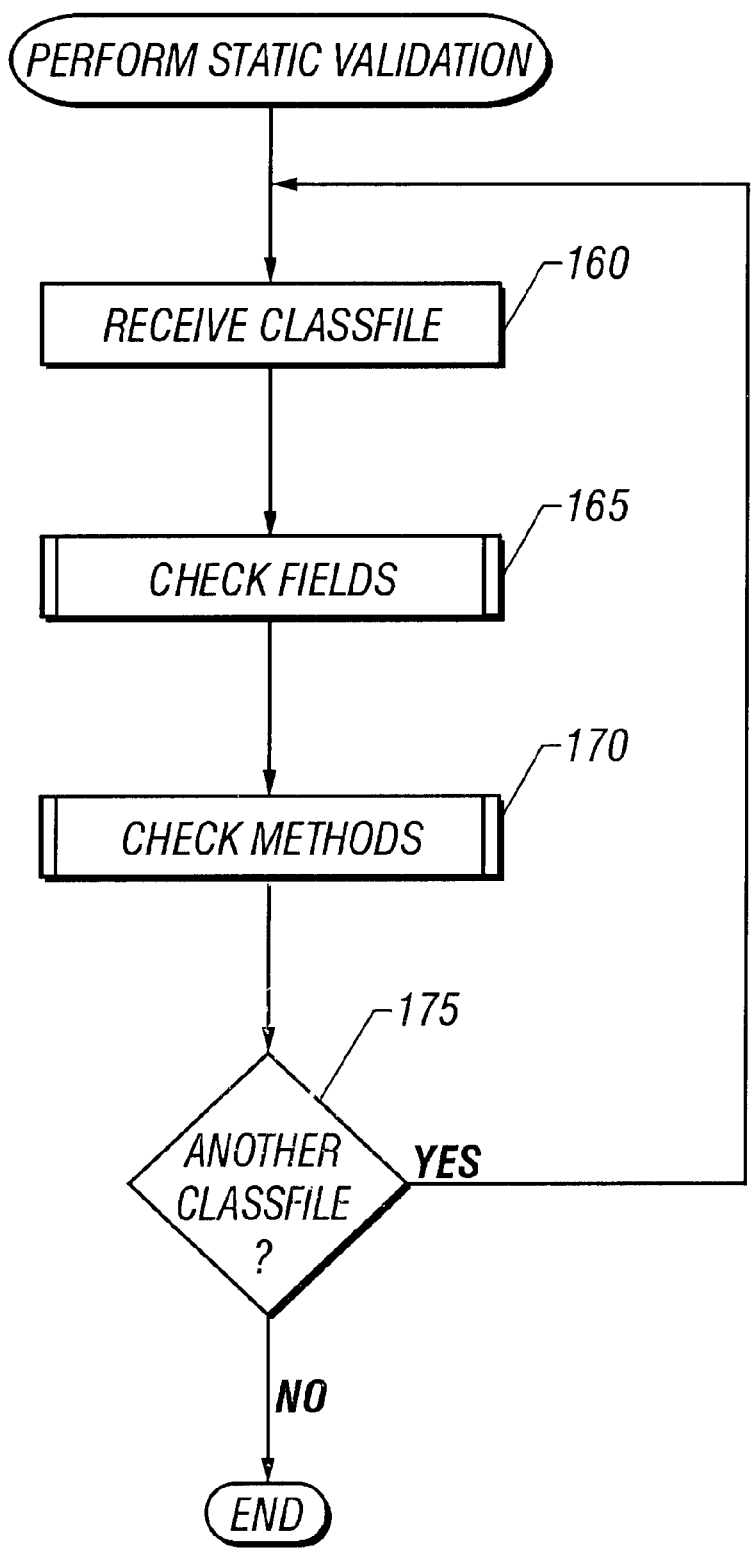
FIG. 3 is a flow diagram that illustrates performing static validation in accordance with one embodiment of the present invention.

Turning now to FIG. 3, a flow diagram that illustrates performing static validation in accordance with one embodiment of the present invention is presented. At reference numeral 160, a class file is received. At reference numeral 165, static validation is performed on fields. At reference numeral 170, static validation is performed on methods. At reference numeral 175, a check is made to determine whether another class file remains to be validated. If there is another class file, execution continues at reference numeral 160. This process continues until all class files have been validated.

Figure 4A:
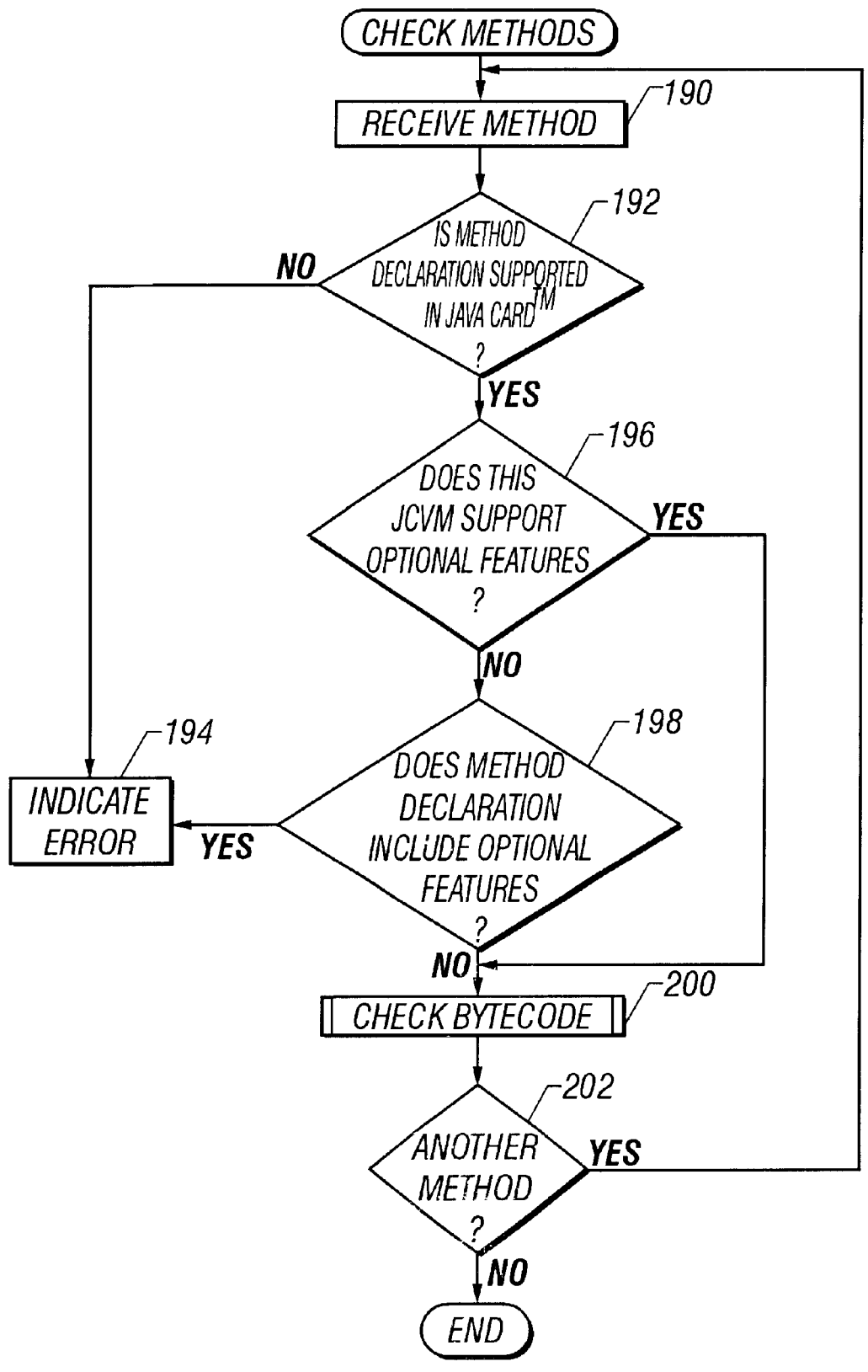
FIG. 4A is a flow diagram that illustrates performing static validation on methods in accordance with one embodiment of the present invention.

Turning now to FIG. 4, a flow diagram that illustrates performing static validation on methods in accordance with one embodiment of the present invention is presented. At reference numeral 190, a method is received. At reference numeral 192, a check is made to determine whether the method declaration is supported by the language subset. In Java Card™ technology, parameter types, return types and access flags are checked to determine whether they are valid. For example, character string, long, double and float types are supported by Java™ technology, but the types are not supported by Java Card™ technology. Additionally, Java™ technology supports the "synchronized" and "native" access flags, but Java Card™ technology does not. If a type or access flag is not supported, an error is indicated at reference numeral 194.

If the method declaration is supported, a check is made at reference numeral 196 to determine whether a particular execution environment supports an optional feature. In Java Card™ technology, the type int is an example of an optional feature. A particular execution environment (the Java Card™ Virtual Machine) determines whether the option is supported. If the execution environment does not support an optional feature, a check is made at reference numeral 198 to determine whether the method declaration includes an optional feature. If the method declaration includes an optional feature, an error is indicated at reference numeral 194. At reference numeral 200, the bytecode of the method is validated. At reference numeral 202, a check is made to determine whether another method remains to be validated. If there is another method, execution continues at reference numeral 190. This process continues until all methods in the class file have been validated.

Figure 4B:
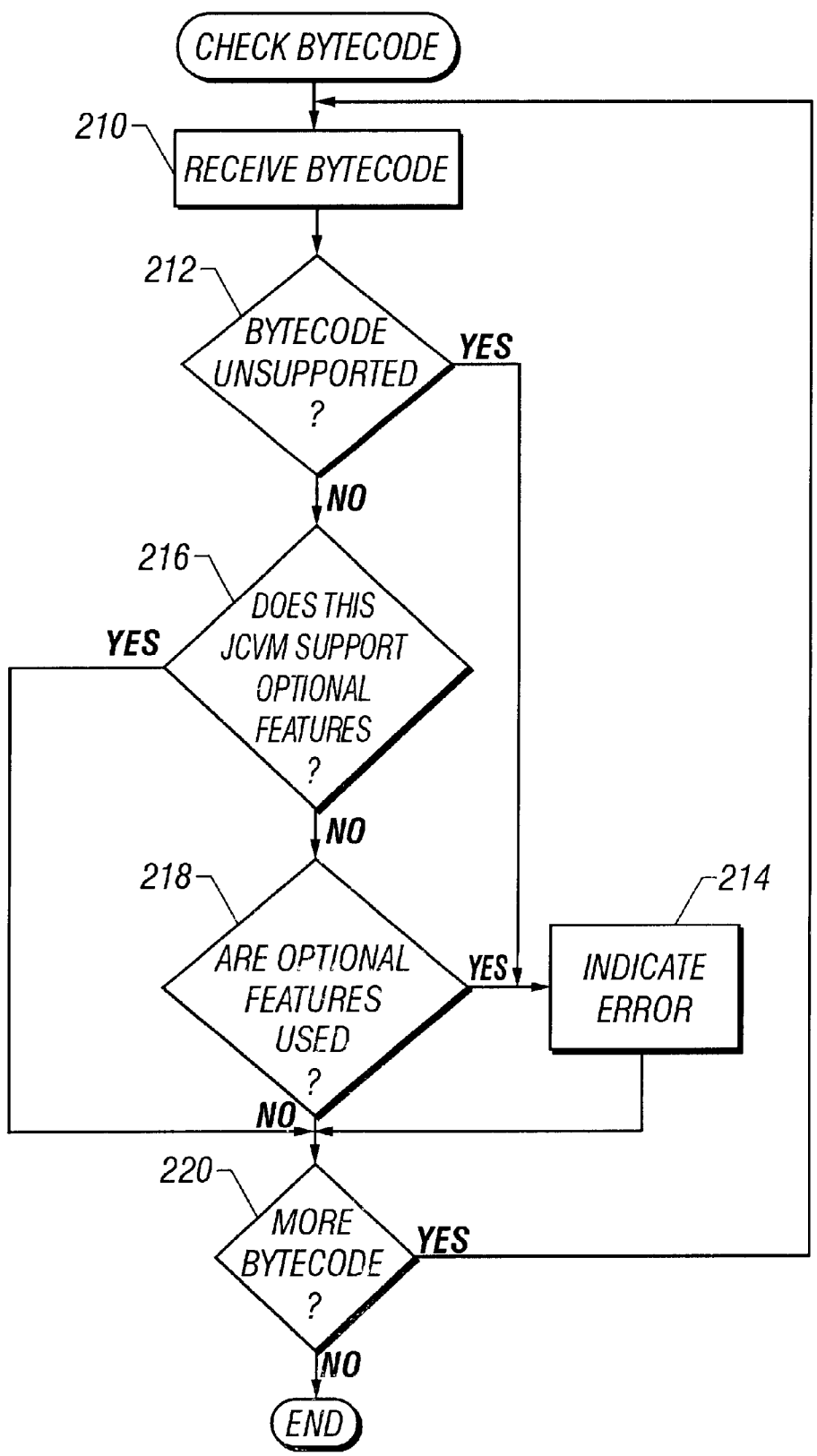
FIG. 4B is a flow diagram that illustrates performing static validation on method bytecode in accordance with one embodiment of the present invention.

Turning now to FIG. 4B, a flow diagram that illustrates validating the bytecode of a method in accordance with one embodiment of the present invention is illustrated. At reference numeral 210, a bytecode is received. At reference numeral 212, a determination is made regarding whether the bytecode is supported by the language subset. The bytecode is checked to determine whether unsupported data types are used, and whether operations on values of unsupported data types are used. The is bytecode is also checked to determine whether unsupported features are used. For example, threads are not supported in Java Card™ technology. The keyword "synchronized" indicates the use of monitors to synchronize threads and this keyword has a particular bytecode representation. Its presence in the bytecode indicates the use of a monitor.

If the bytecode is not supported or is used to operate on data of unsupported types, an error is indicated at reference numeral 214. If the bytecode is supported, a check is made at reference numeral 216 to determine whether the particular execution environment supports options. If the execution environment does not support options, a check is made at reference numeral 218 to determine whether the checked bytecode represents an optional feature. If the checked bytecode represents an optional feature, an error is indicated at reference numeral 214. At reference numeral 220, a check is made to determine whether more bytecodes remain in the method. If more bytecodes remain, execution continues at reference numeral 210. This process continues until all bytecodes in a method have been checked.

Figure 5:
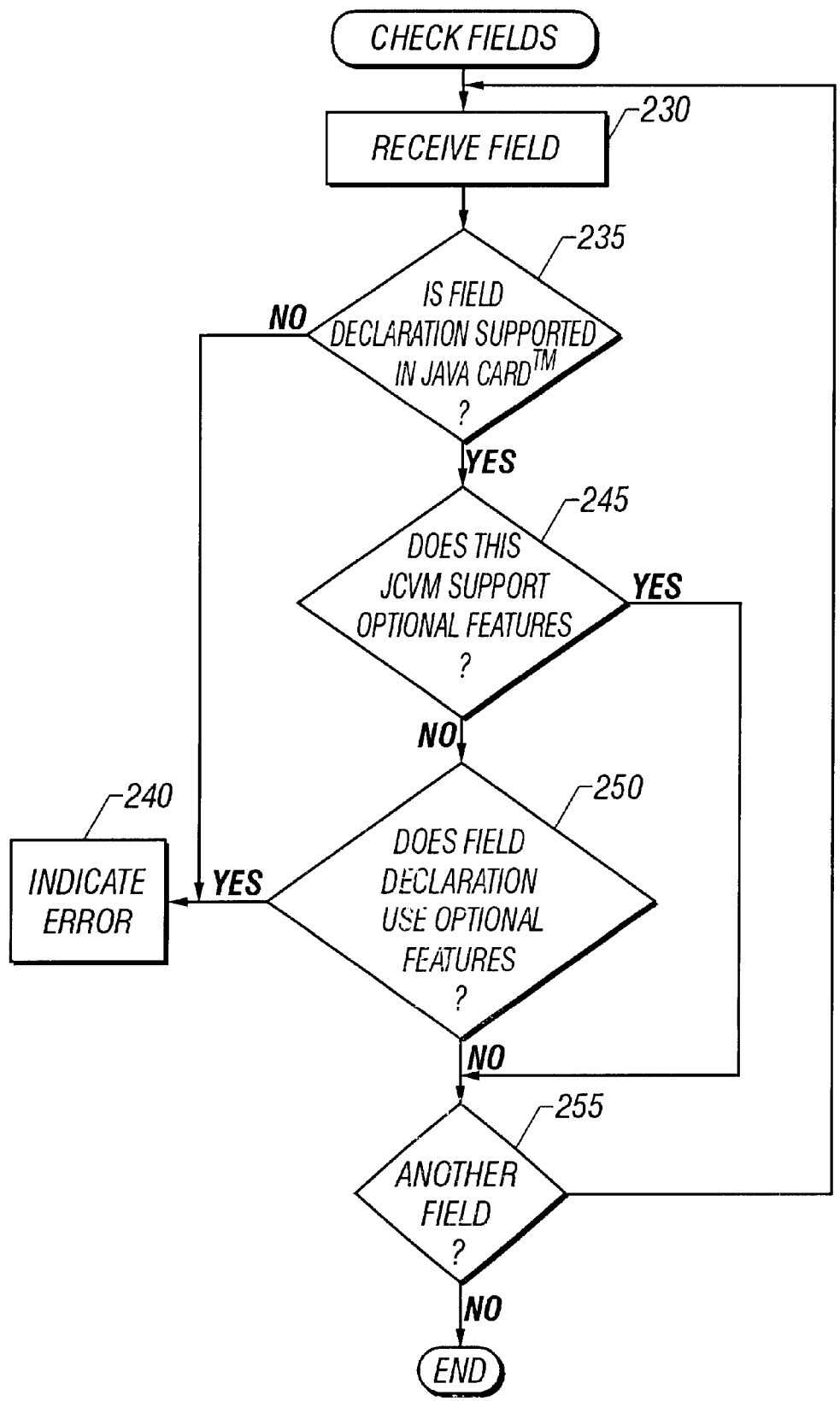
FIG. 5 is a flow diagram that illustrates performing static validation on fields in accordance with one embodiment of the present invention.

Turning now to FIG. 5, a flow diagram that illustrates performing static validation on fields in accordance with one embodiment of the present invention is presented. Static validation on fields is performed in a manner similar to static validation on methods. In Java Card™ technology, invalid access flags of fields include by way of example "volatile" and "transient". An error is indicated if a field declaration uses unsupported types and access flags. An error is also indicated if a field declaration uses optional features, such as type int in Java Card™ technology, is not supported by the execution environment.

The Java™ Virtual Machine instruction set defines an instruction set to handle values of integral types byte, short and int. The variables of type byte and short are widened to the integral type int during compilation. Therefore, the values computed are also 32-bit int values. However, the Java Card™ virtual machine defines a separate instruction set to handle variables of types byte and short in addition to the instruction set to handle variables of integral type int.

Support of the 32-bit int type on Java Card™ platforms is optional. Target platforms that do not support the 32-bit int type cannot use 32-bit int type variables. Also, the 32-bit arithmetic bytecode used in the Java™ class files must be converted to a 16-bit instruction used in the Java Card™ instruction set. Consequently, values computed by 16-bit instruction are 16-bit int values. This conversion may create the potential for overflow that extends beyond the 16-bit representation. Erroneous results may be created if values that carry the potential for overflow are fed into an instruction that is sensitive to overflow or if it is used as an array index. Determining whether the potential for overflow exists includes generating a data flow. The details of this process of determining when the potential for overflow exists are discussed in U.S. patent application filed Nov. 15, 1999, Chen and Schwabe, entitled OPTIMIZATION OF N-BASE TYPED ARITHMETIC EXPRESSIONS, and will not be discussed further to prevent obfuscation of the present invention.

Figure 6:
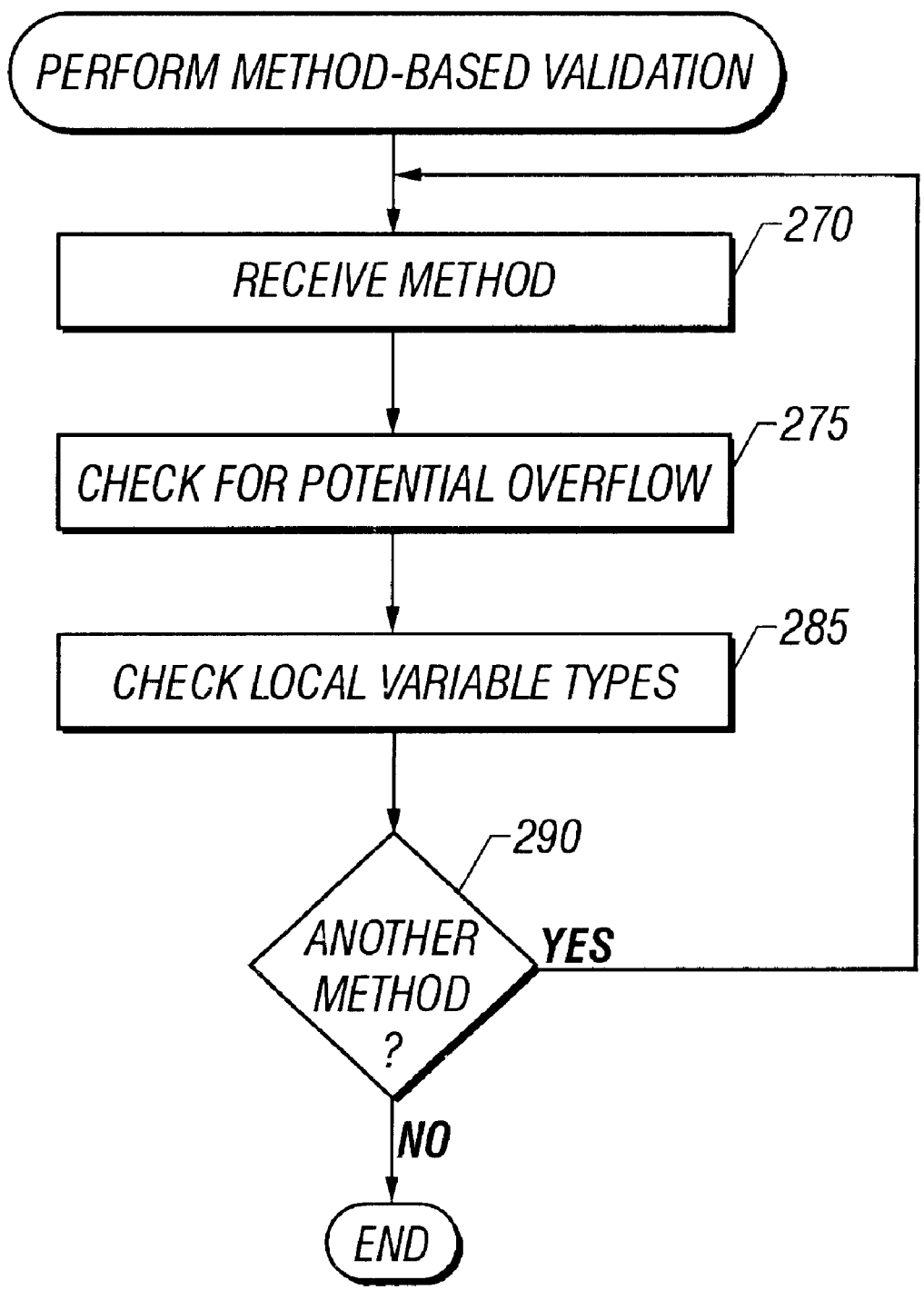
FIG. 6 is a flow diagram that illustrates performing method-based validation in accordance with one embodiment of the present invention.

Turning now to FIG. 6, a flow diagram that illustrates performing method-based validation in accordance with one embodiment of the present invention is presented. In method-based validation, methods are analyzed to determine whether potential overflow conditions exist. At reference numeral 270, a method is received. At reference numeral 275, the method is checked for potential overflow conditions.

At reference numeral 285, local variable types are validated. In Java Card™ technology, a compilation directive determines whether the compiler generates a local variable attribute table as part of the code generation process. The local variable attribute variable includes type information for local variables. If the local variable attribute table is present, validation local variables for valid types may be performed in the "static validation" stage discussed above. If the local variable attribute table is not present, the data flow is used at this stage to determine the type of local variables. An error is indicated if any local variable has an unsupported type or an optional type that is not supported by the target device.

At reference numeral 290, a check is made to determine whether another method remains to be validated. If another method remains, execution continues at reference numeral 270. This process continues until all methods in the class file have been validated.

Figure 7:
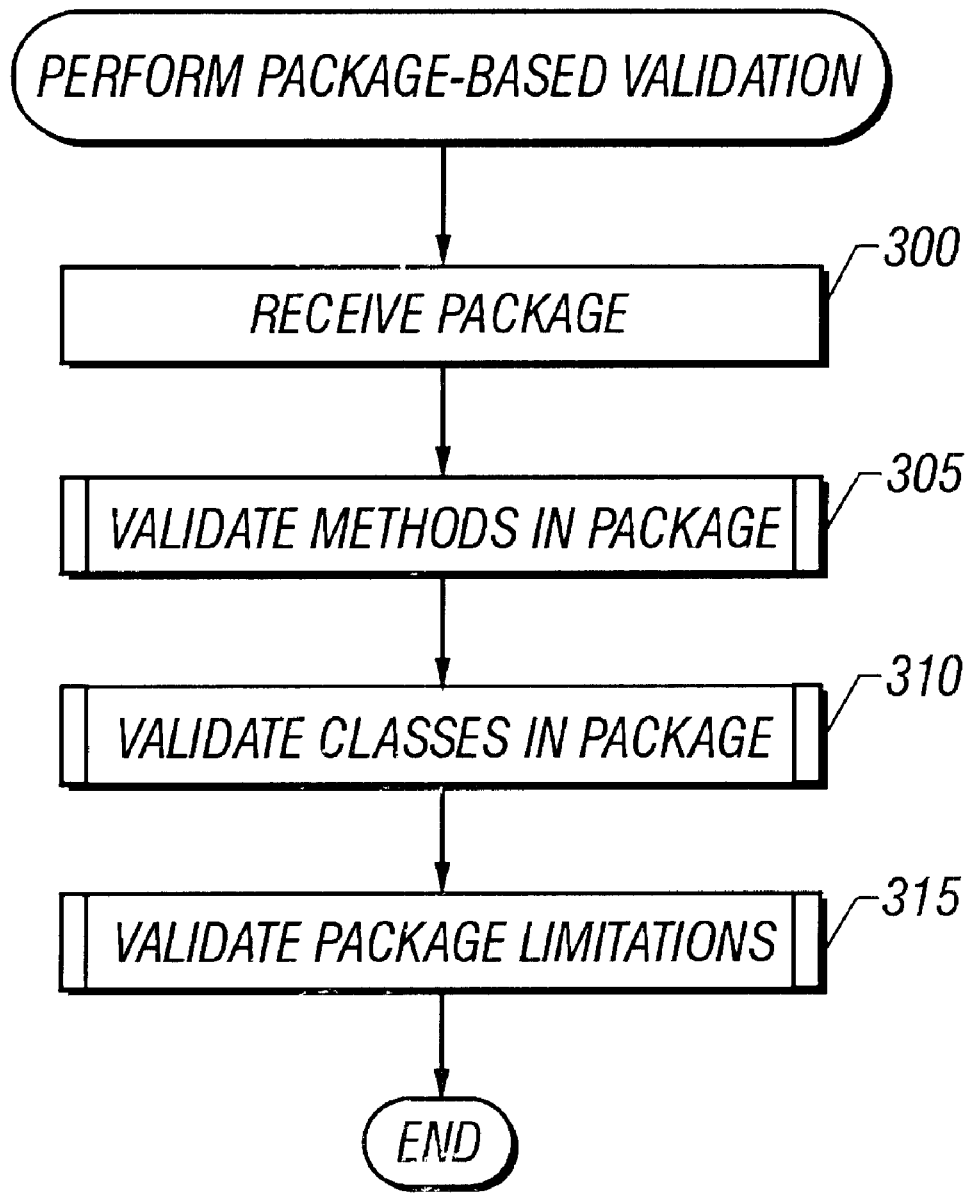
FIG. 7 is a flow diagram that illustrates performing package-based validation in accordance with one embodiment of the present invention.

Turning now to FIG. 7, a flow diagram that illustrates performing package-based validation in accordance with one embodiment of the present invention is presented. In package-based validation, supported features with limited ranges are detected. At reference numeral 300, the class files comprising a package are received. At reference numeral 305, methods within the package are validated. At reference numeral 310, classes within the package are validated. At reference numeral 315, package limitations are validated.

Figure 8:
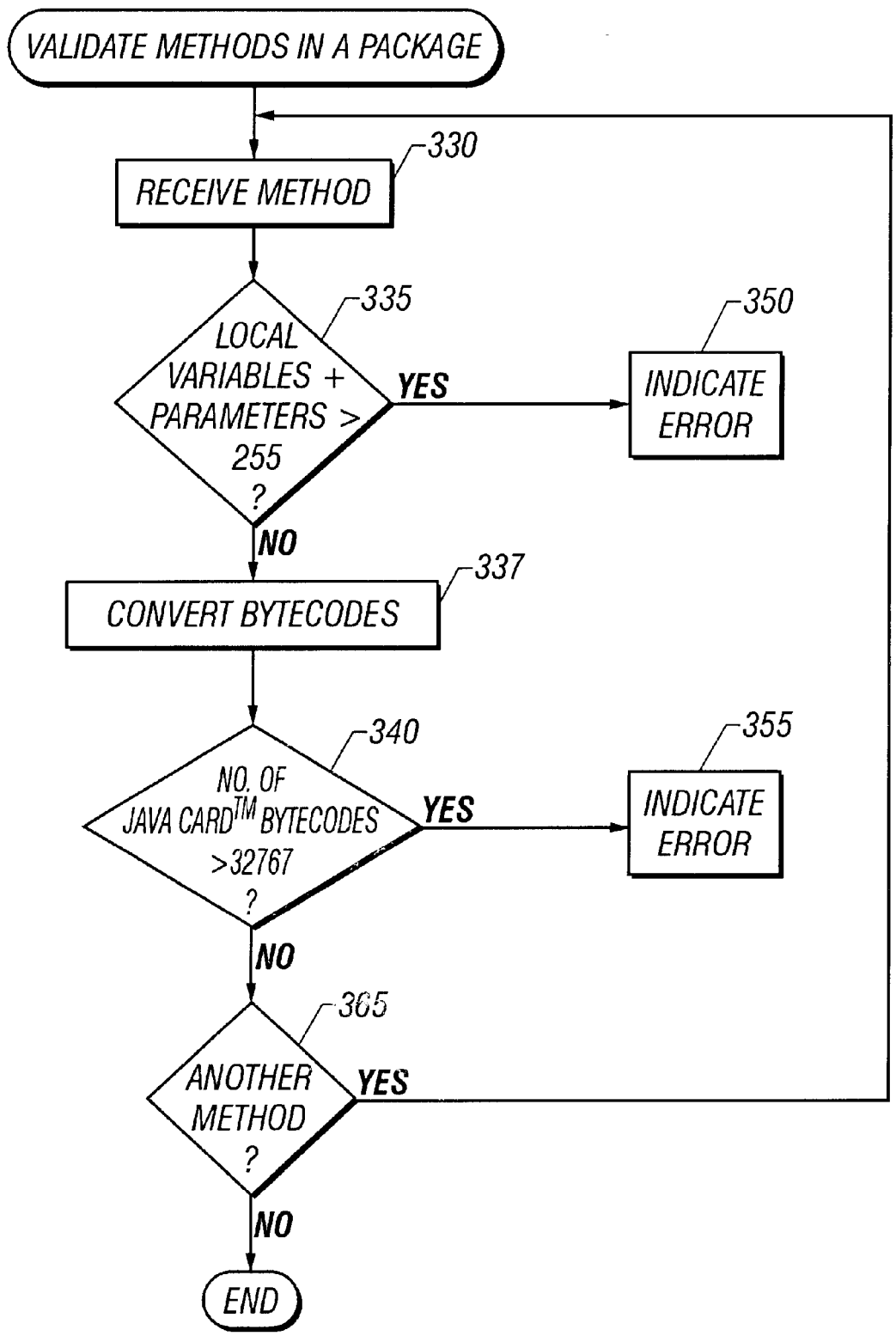
FIG. 8 is a flow diagram that illustrates validating methods in a package in accordance with one embodiment of the present invention.

Turning now to FIG. 8, a flow diagram that illustrates validating methods in a package in accordance with one embodiment of the present invention is presented. At reference numeral 330, a method is received. At reference numeral 335, a check is made to determine whether the total number of variables and parameters exceeds a predetermined number. In Java Card™ technology, the total number of variables and parameters cannot exceed 255. If the total number exceeds the predetermined number, an error is indicated at reference numeral 350. At reference numeral 337, the Java bytecodes are converted to Java Card™ bytecodes. At reference numeral 340, a check is made to determine whether the total number of Java Card™ bytecodes within the method exceed a predetermined number. In Java Card™ technology, the total number of Java Card™ bytecodes cannot exceed 32,767. If the number of bytecodes exceeds the limit, an error is indicated at reference numeral 355. At reference numeral 365, a check is made to determine whether all methods in a package have been validated. If another method remains, execution continues at reference numeral 330. This process continues until all methods have been validated.

Figure 9A:
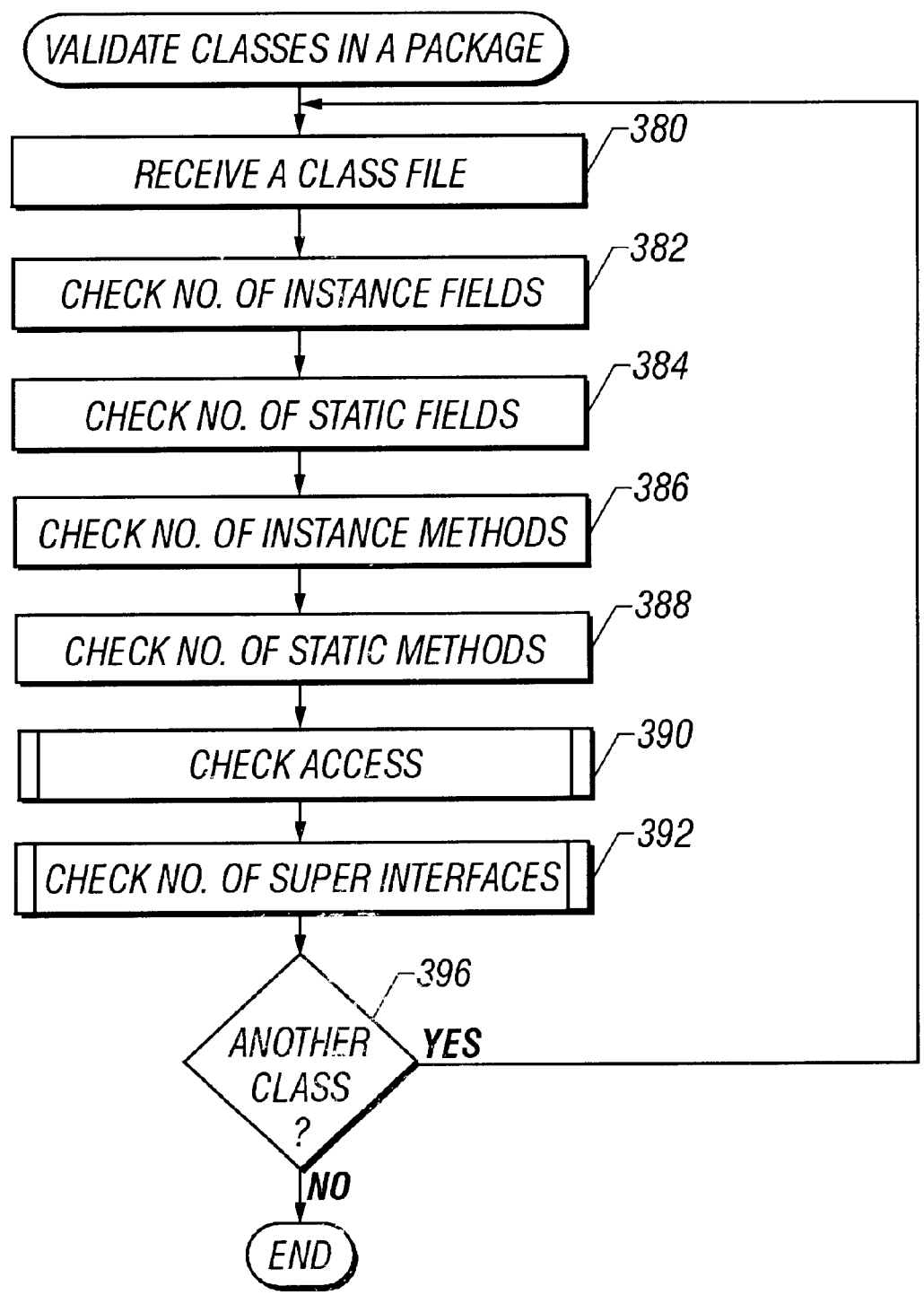
FIG. 9A is a flow diagram that illustrates validating classes in a package in accordance with one embodiment of the present invention.

Turning now to FIG. 9A, a flow diagram that illustrates validating classes and interfaces in a package in accordance with one embodiment of the present invention is presented. At reference numeral 380, a class file is received. At reference numeral 382, the number of instance fields within the class is validated. In Java Card™ technology, the total number of instance fields per class must not exceed 255. This number includes fields declared in the class and all instance fields declared in each superclass of the class. Typically, information about fields within a superclass is not contained within the class file for the subclass. Therefore, the class file for the superclass must be read to determine the number of instance fields in the superclass. This process continues in a recursive fashion until the root superclass has been examined. The total number of instance fields obtained this way is then compared to the maximum number of instance fields.

At reference numeral 384, the number of static fields is checked. In Java Card™ technology, the total number of public and protected static fields per class cannot exceed 256. Unlike instance fields, there exists only one incarnation of a static field. Thus, the maximum number for static fields does not apply to static fields in each superclass of the class.

At reference numeral 386, the number of instance methods is checked. In Java Card™ technology, the total number of package visible instance methods must not exceed 128, and the total number of public and protected instance methods must not exceed 128. These numbers include methods declared in the class and all methods declared in each superclass of the class. Typically, information about methods within a superclass is not contained within the class file for the subclass. Therefore, the class file for the superclass must be read to determine the number of instance methods in the superclass. For public and protected instance methods, this process continues in a recursive fashion until the root superclass has been examined. For package visible methods, the recursion continues until all super classes within the checked package have been examined. Lastly, any duplicates are removed.

At reference numeral 388, the number of static methods is checked. In Java Card™ technology, the total number of public and protected static methods must not exceed 256. Unlike instance methods, there is only one incarnation of a static method within a class. Thus, the maximum number for static methods does not apply to static methods in each superclass of the class type.

At reference numeral 390, the class access control is validated. This validation determines whether a public interface improperly extends a package visible interface, and whether the access visibility of a package default method in a superclass is improperly changed to public or protected in a subclass.

At reference numeral 392, a check is made to determine whether the class or the interface has more than a predetermined number of superinterfaces. In Java Card™ technology, the maximum number of superinterfaces is 15. If the class file represents a class, the superinterfaces of this class include interfaces directly implemented by this class and superinterfaces of each directly implemented interface, as well as interfaces implemented by any superclasses. Thus, the total number of superinterfaces is determined by recursively visiting each superinterface and superclass until all interfaces are counted. The number of interfaces remaining after duplicates have been removed is compared to the maximum number of implemented interfaces.

If the class file represents an interface, the superinterfaces of this checked interface include interfaces that are directly inherited by this interface and superinterfaces of each direct superinterface. Thus, the total number of superinterfaces is determined by recursively determining which interfaces each interface and its superinterfaces inherit from. The number of interfaces remaining after duplicates have been removed is compared to the maximum number of inheritable interfaces.

At reference numeral 396, a determination is made regarding whether more class files remain to be validated. If more classes remain, execution continues at reference numeral 380. This process continues until all classes have been validated.

Figure 9B:
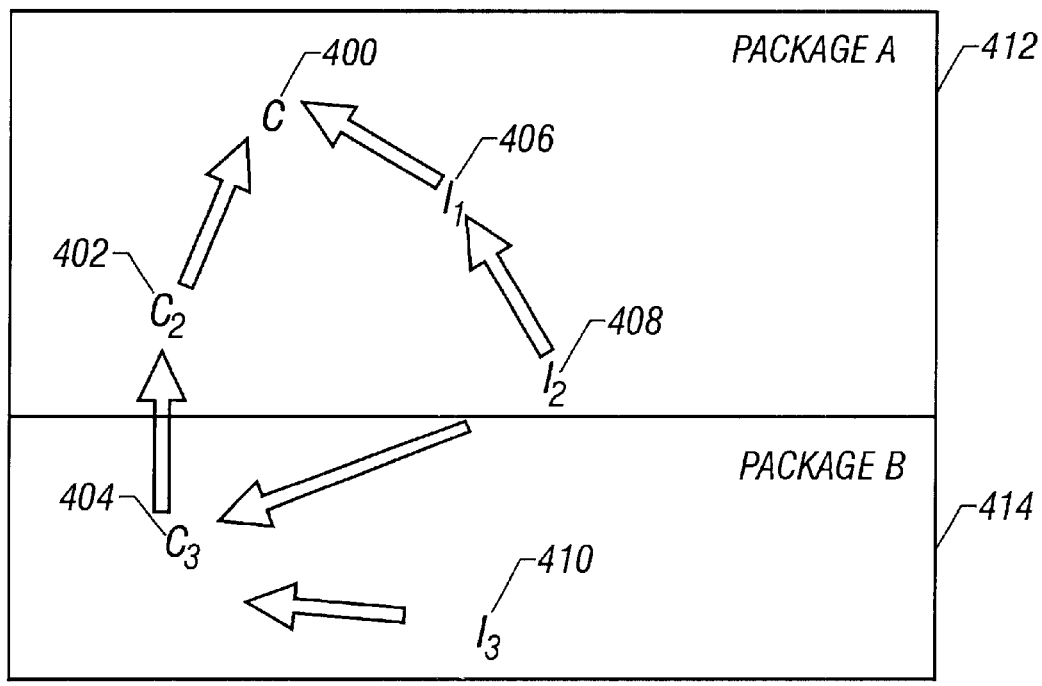
FIG. 9B is a block diagram that illustrates counting the number of implemented interfaces in accordance with one embodiment of the present invention.

Turning now to FIG. 9B, a block diagram that illustrates counting the number of superinterfaces of a class in accordance with one embodiment of the present invention is presented. Three classes are represented by $C_1$ 400, $C_2$ 402 and $C_3$ 404. Three interfaces are represented by $I_1$ 406, $I_2$ 408 and $I_3$ 410. Class $C_3$ and interface $I_3$ are in package B 414, while the other members are in package A 412. Starting with Class $C_1$, the number of interfaces directly implemented by the class and all their superinterfaces is added to the number of interfaces implemented by the superclass of that class and duplicates are removed. Here, first interfaces implemented by $C_1$ is examined. Class $C_1$ implements $I_1$. $I_1$ inherits $I_2$. Thus, $I_1$ and $I_2$ are counted. If $I_2$ also inherits any interfaces, those interfaces are also counted. Next, the super class of $C_1$ is examined. Class $C_1$ extends from $C_2$. Class $C_2$ does not implement any interfaces but extends $C_3$. Class $C_3$ implements $(I_2, I_3)$. Thus, class $C_2$ also implements $(I_2$ and $I_{13})$. Moving back to class $C_1$, class $C_1$ implements interface $I_1$ and the interface $I_1$'s superinterface $I_2$ and interfaces implemented by its super class $C_2$. Therefore, $C_1$ implements $(I_1, I_2)+(I_2, I_3)$. After removing duplicates, $C_1$ implements three interfaces: $(I_1, I_2)+(I_{12}, I_3)=(I_1, I_2, I_3)$. This number is less than the maximum number for Java Card™ technology.

Figure 9C:
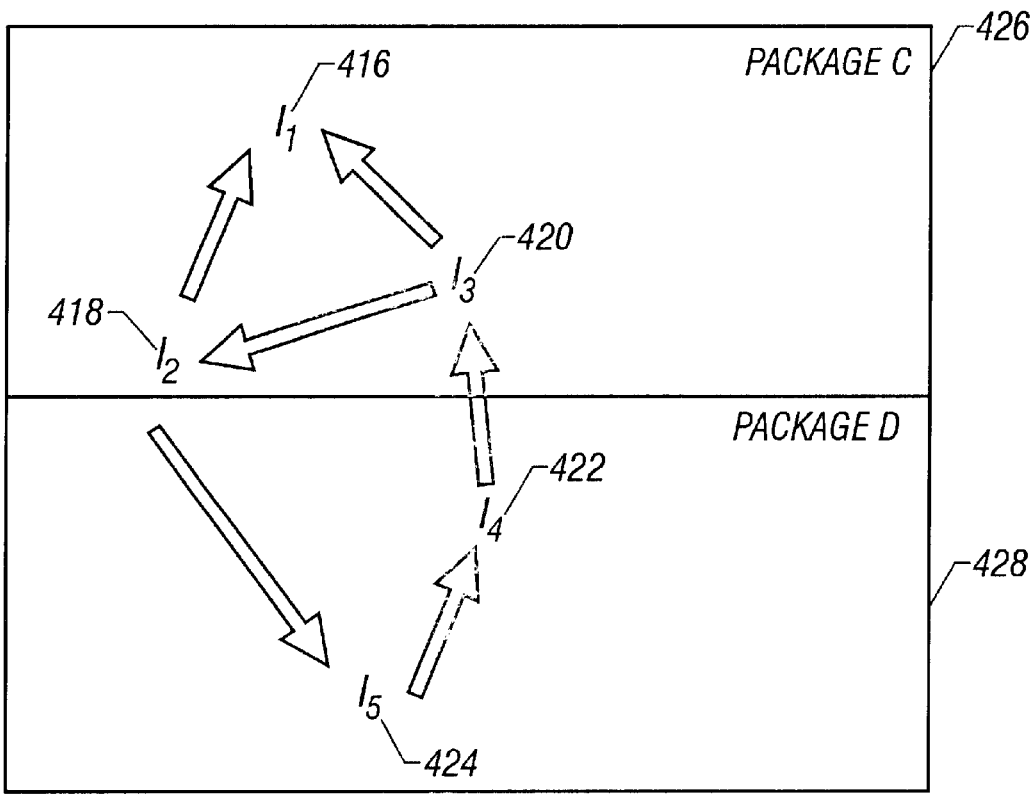
FIG. 9C is a block diagram that illustrates counting the number of inherited interfaces in accordance with one embodiment of the present invention.

Turning now to FIG. 9C, a block diagram that illustrates counting the number of superinterfaces of an interface in accordance with one embodiment of the present invention is presented. Five interfaces are represented by $I_1$ 416, $I_2$ 418, $I_3$ 420, $I_4$ 422 and $I_5$ 424. Interfaces $I_4$ and $I_5$ are located in package D 428 and the other interfaces are in a separate package C 426. Interface $I_1$ extends from $I_2$ and $I_3$, so Interface $I_1$ has superinterface $I_2$ and $I_3$. In addition, interface $I_1$ inherits from whatever $I_2$ inherits from and from whatever $I_3$ inherits from. As shown in FIG. 9C, $I_3$ extends from $I_2$, and $I_4$, $I_4$ extends from $I_5$ and $I_5$ extends from $I_2$. Thus, $I_4$ inherits from $(I_2)+(I_5)=(I_2, I_5)$. $I_3$ inherits from $(I_4)+(I_2, I_5)+(I_2)=(I_2, I_4, I_5)$. Accordingly, $I_1$ inherits from $(I_2)+(I_3)+(I_2, I_4, I_5)$. After duplicates are removed, II inherits from four interfaces: $(I_2, I_3, I_4, I_5)$. This number is less than the maximum number for Java Card™ technology.

Figure 10A:
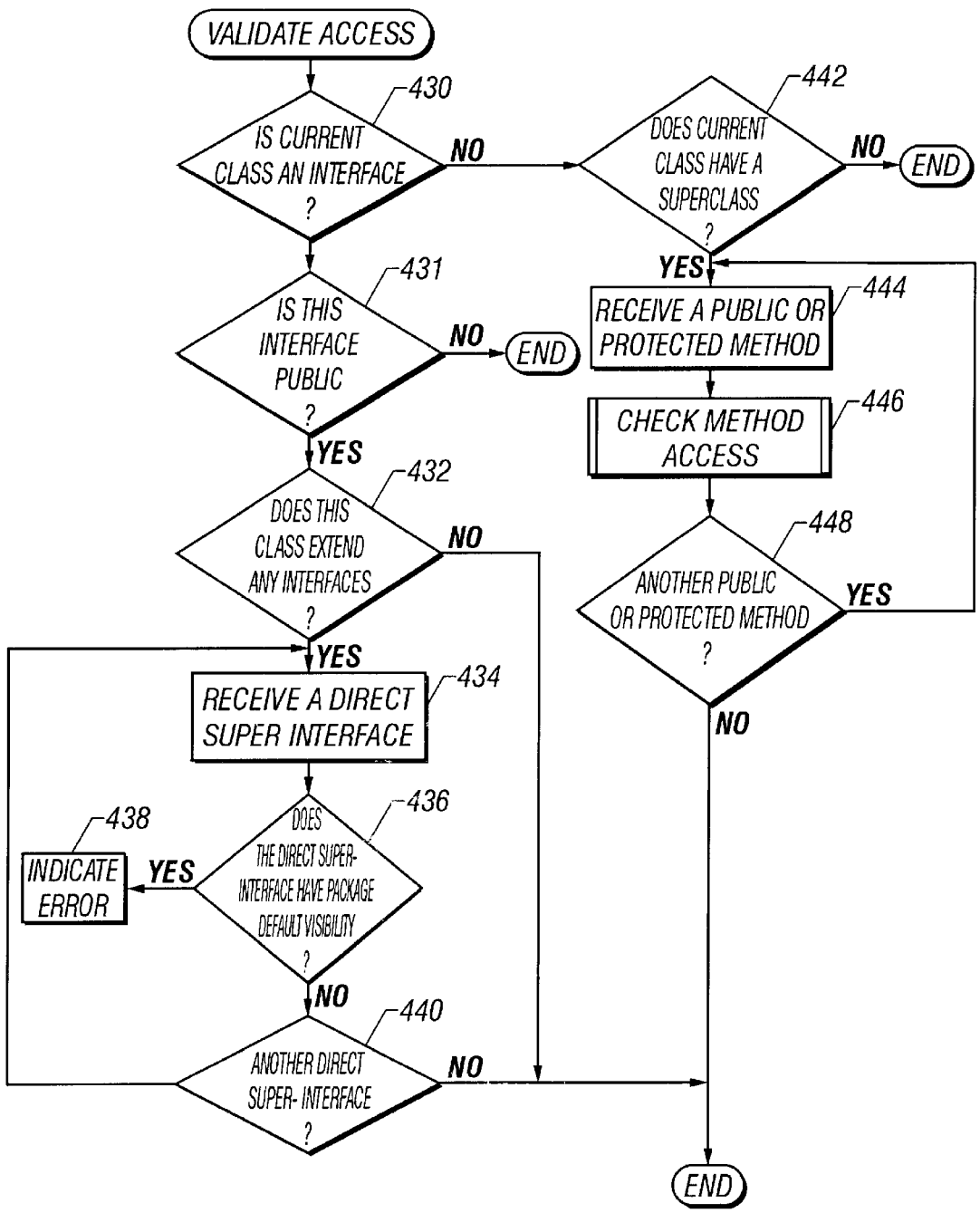
FIG. 10A is a flow diagram that illustrates validating class access control in accordance with one embodiment of the present invention.

Turning now to FIG. 10A, a flow diagram that illustrates validating access control in accordance with one embodiment of the present invention is presented. Since a class file can represent either a class or an interface, whether the examined class file contains an interface is checked at reference numeral 430. If the class file represents an interface, whether the interface is public is checked at reference numeral 431. In Java Card™ technology, a public interface must not extend a package visible interface. Since an interface may extend at least one superinterface, this determination requires examining each superinterface within a package to determine whether any of the interfaces in the chain is a package visible interface.

If the interface is public, a check is made to determine whether the current interface extends any interfaces at reference numeral 432. If the current interface directly inherits an interface, the interface is received at reference numeral 434. At reference numeral 436, a determination is made regarding whether the direct superinterface has package default visibility. A direct superinterface is an interface immediately inherited by the current interface. If the direct superinterface has package default visibility, an error is indicated at reference numeral 438. If the direct superinterface does not have package default visibility, a check is made at reference numeral 440 to determine whether another superinterface remains. If there is another superinterface, execution continues at reference numeral 434.

Java Card™ technology also provides that the access visibility of a package default method in a superclass must not be changed to public and protected in a subclass. This is checked beginning at reference numeral 442. If the current class file represents a class, a determination is made at reference numeral 442 regarding whether the current class has a superclass. If the current class has a superclass, a public or protected method of the current class is received at reference numeral 444. At reference numeral 446, the method is checked to determine whether the method is also defined in the superclass that has package default visibility. At reference numeral 448, a determination is made regarding whether there are more public or protected methods in the current class. If there are more, execution continues at reference numeral 444. This process continues until all public and protected methods in the current class have been examined.

Figure 10B:
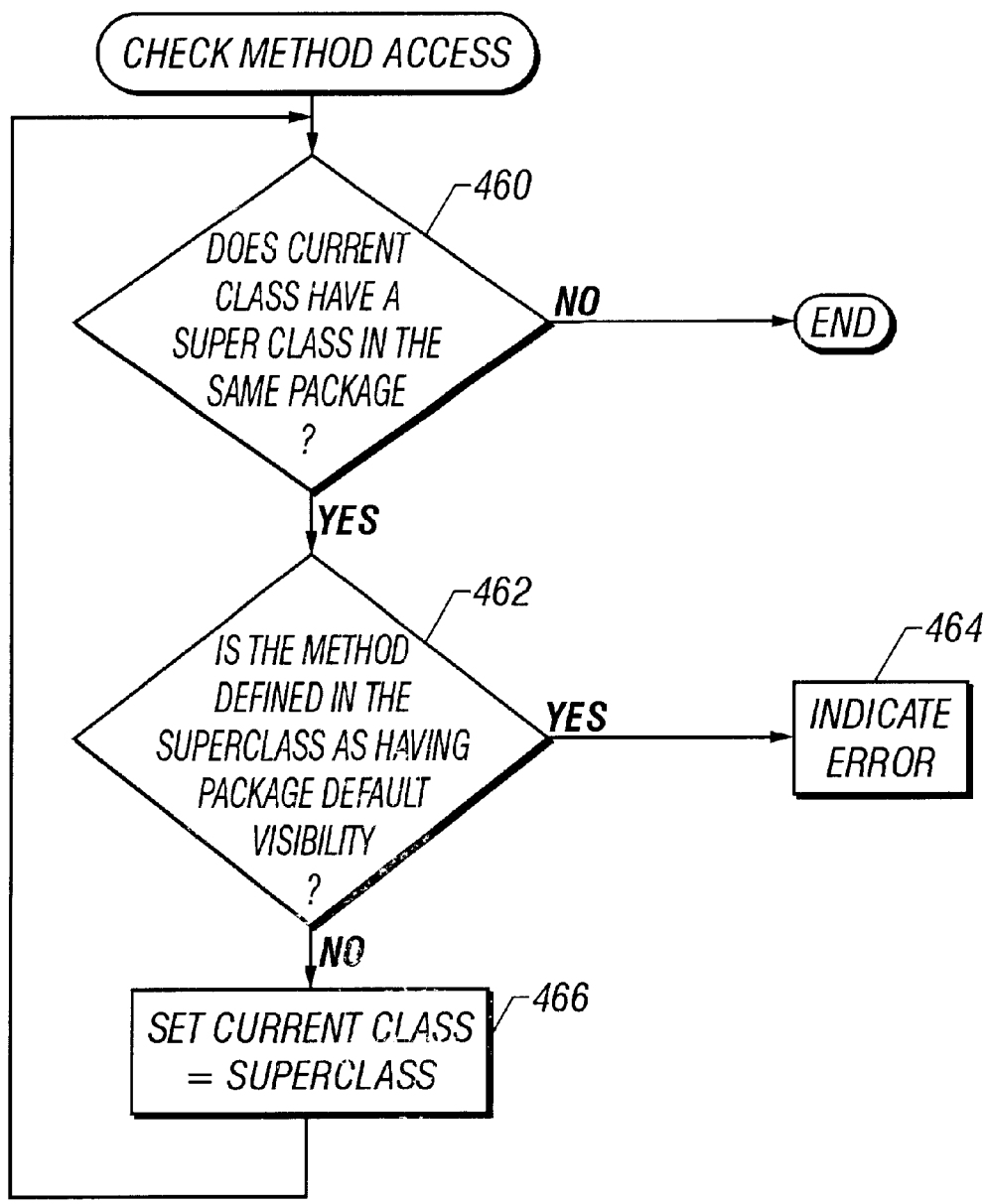
FIG. 10B is a flow diagram that illustrates determining whether a package default method has been made a public and protected method in accordance with one embodiment of the present invention.

Turning now to FIG. 10B, a flow diagram that illustrates determining whether a package default method has been made a public and protected method in accordance with the present invention is presented. At reference numeral 460, a check is made to determine whether the current class has a superclass in the same package. If the current class has a superclass in the same package, a determination is made at reference numeral 462 regarding whether the method is also defined in the superclass but has package default visibility. If the corresponding method has package default visibility in the superclass, an error is indicated at reference numeral 464. If the corresponding method is not defined in the superclass or does not have package default visibility, the current class is set to the superclass of the current class and the process is repeated, starting at reference numeral 460. This process of checking methods continues in a recursive fashion until reaching the root of the superclass or the package boundary.

Figure 11:
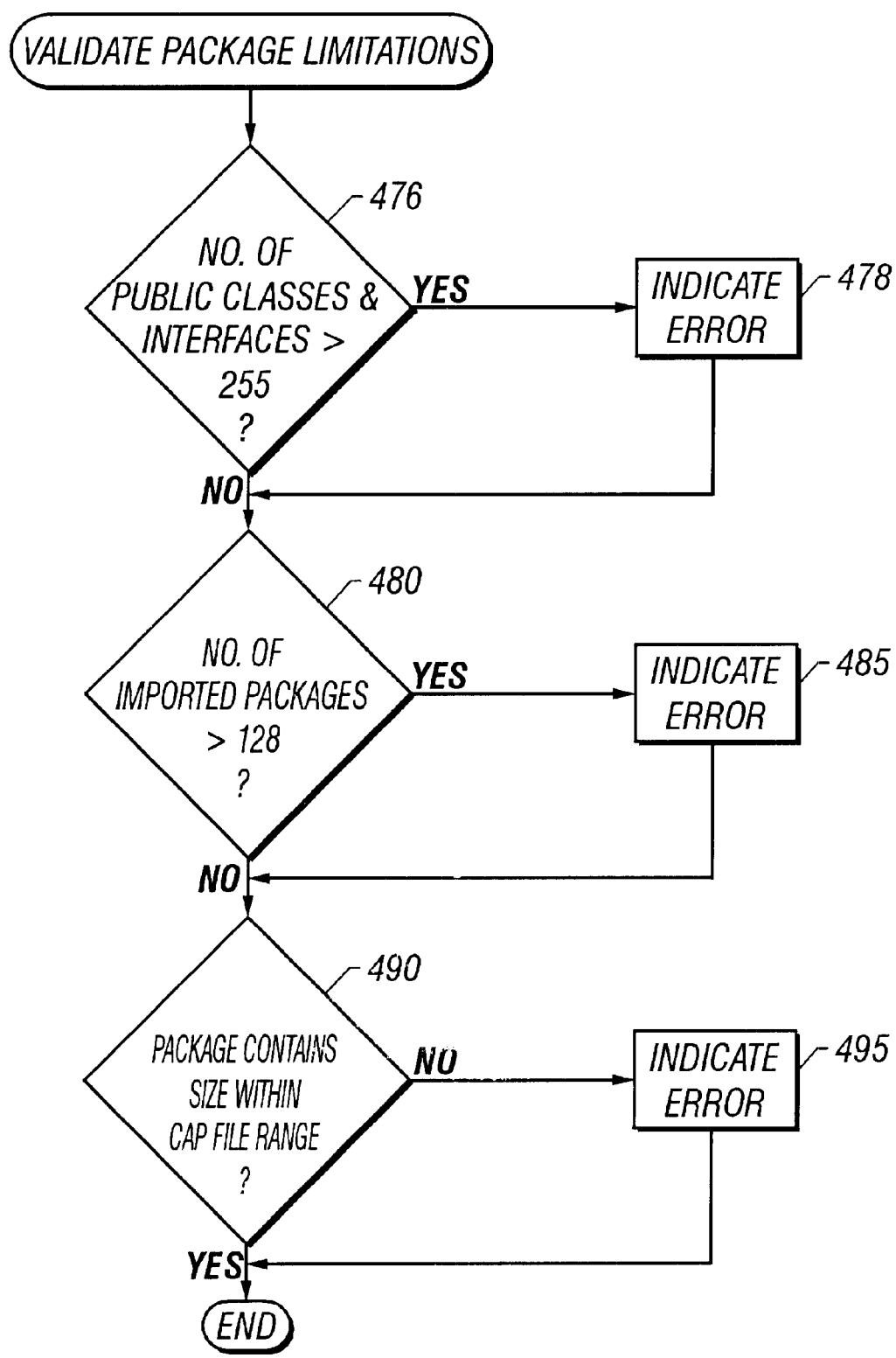
FIG. 11 is a flow diagram that illustrates validating package limitations in accordance with one embodiment of the present invention.

Turning now to FIG. 11, a flow diagram that illustrates validating package limitations in accordance with one embodiment of the present invention is presented. At reference numeral 476, the number of classes and interfaces defined in the package is checked. In Java Card™ technology, the maximum number of classes and interfaces in a package is 255. If the number exceeds the maximum, an error is indicated at reference numeral 478. At reference numeral 480, a determination is made regarding whether the number of packages imported by this checked package is greater than a predetermined number. In Java Card™ technology, a package cannot import more than 128 packages.

At reference numeral 490, CAP file component sizes are validated after class files in a package are converted into a CAP file. In Java Card™ technology, a CAP file consists of a set of components. Each component describes a set of elements in the Java™ package defined, or an aspect of the CAP file. All components have the following general format:

```
component {
    u1 tag
    u2 size
    u1 info[]
}
```

The "size" item indicates the number of bytes in the "info" array component. The maximum size represented by the size component is 64 K bytes. The content and format of the info array varies with the type of component. One type of component is the method component. The method component has the following general format:

```
method_component {
    u1 tag
    u2 size
    .
    .
    .
    method_info methods[]
}
```

The methods array may contain multiple methods, and each method is less than 32 K bytes. However, it is possible for total number of bytes used for all methods to exceed the 64 K limitation. Accordingly, the number of bytes within each component is summed and the total is compared to the maximum size (64 K). If the total is greater than the limit, an error is indicated at reference numeral 495.

In the Java Card technology, an "export" file is a binary file that contains all publicly accessible information of a Java package. According to another embodiment of the present invention, at the stage of performing package-based validation, checks to a super class or a super interface are performed by checking an "export" file, which represents the package that defines the superclass or the superinterface. This export file is used instead of the class file of the super class or the super interface. However, because the export file only contains publicly accessible information, Package default classes and interfaces, and package default and private methods and fields are not included. Therefore, some checks in the package-based validation will need to be deferred until card-based validation because not enough information is available As an example of deferring checks until card-based validation, an accurate count of the number of superinterfaces requires that both package and public visible interfaces be included. Since export files contain only publicly accessible information, package visible interfaces are not included. Thus, if the number of public superinterfaces was determined during package-based validation to be less than the maximum amount, the number of public and package visible interfaces would have to be repeated later in card-based validation, when information about package visible interfaces was available. However, if a count of the number of public superinterfaces was greater than the maximum amount, further evaluation would be unnecessary because the maximum amount of superinterfaces has already been exceeded.

Another case where deferring checks until card-based validation may be required is counting the number of instance fields in a class. Since the private and package default instance fields in superclasses are not available in export files, an accurate count can not be obtained. Thus, the number of instance fields in a class must be recounted later in card-based validation when information of all classes is available.

According to another embodiment of the present invention, the validation performed in the package-based validation is deferred until the card-based validation described below. In this case, the validation is performed when information of all classes on the card is available.

Figure 12:
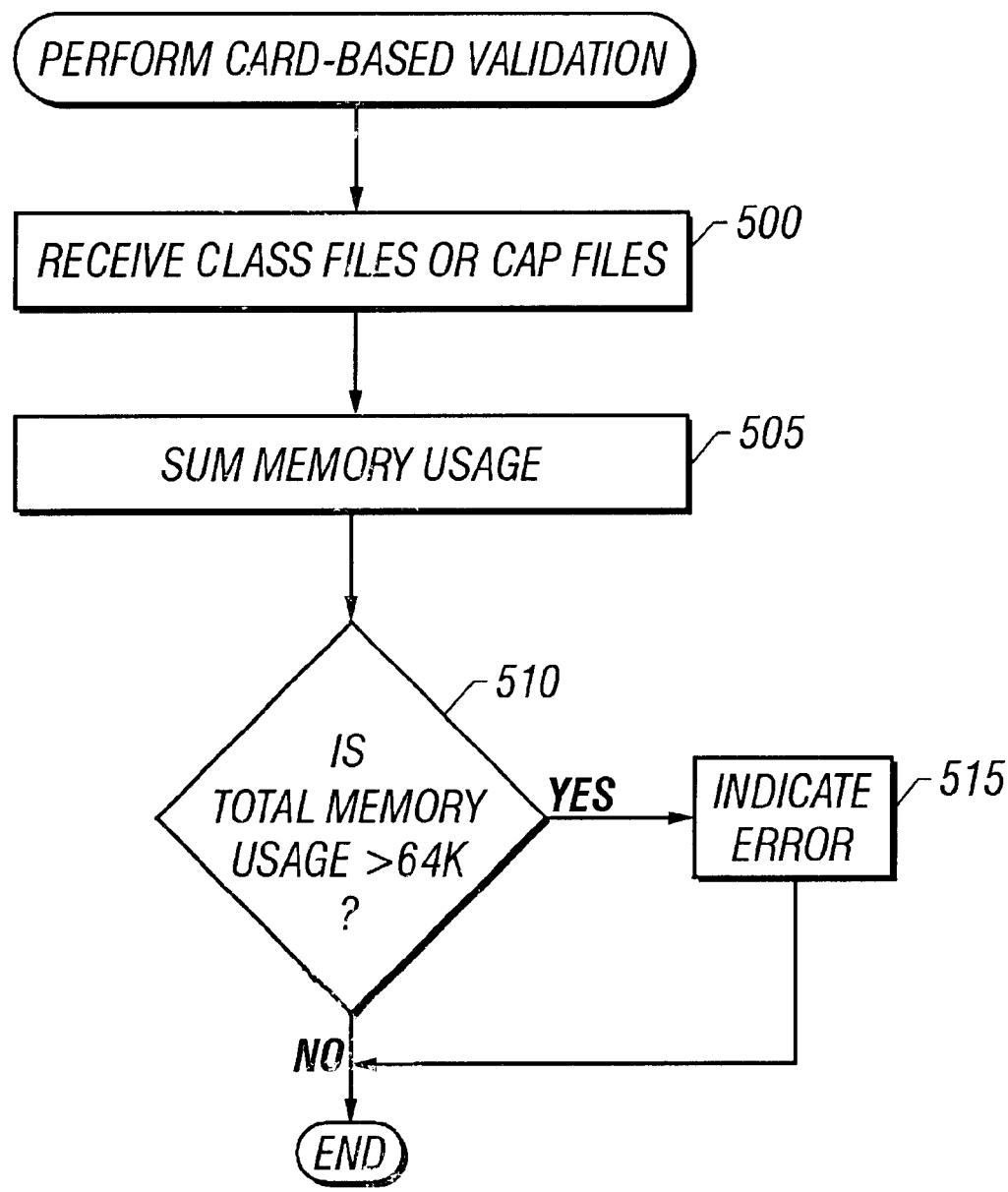
FIG. 12 is a flow diagram that illustrates performing card-based validation in accordance with one embodiment of the present invention.

Turning now to FIG. 12, a flow diagram that illustrates performing card-based validation in accordance with one embodiment of the present invention is presented. At reference numeral 500, the class files or CAP files needed for an executable runtime image are received. At reference numeral 505, the memory usage for all program units within the executable image are summed. At reference numeral 510, the calculated memory usage is compared to a maximum amount. If the total memory usage is greater than the maximum defined for the executable image, an error is indicated at reference numeral 515. In Java Card™ technology, all program units must fit within a 64 K boundary, which is the memory space that will be referenced by the Java Card™ Virtual Machine.

Although the present invention has been illustrated with respect to Java Card™ technology, those of ordinary skill in the art will recognize that the invention is applicable to many other platforms. These platforms include, by way of example, K Virtual Machine (KVM) technology. KVM technology is described in "The K Virtual Machine (KVM)—A White Paper", Jun. 8, 1999, Sun Microsystems, Inc.

The present invention may be implemented in software or firmware, as well as in programmable gate array devices, Application Specific Integrated Circuits (ASICs), and other hardware.

Thus, a novel method for language subset validation has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for language subset validation, comprising:
validating a plurality of program modules comprising a program, each of said program modules including a plurality of bytecodes defined for a first computer language, said first computer language being a hardware-dependent subset of a second computer language, said validating including:
indicating an error condition for each item in said plurality of program modules that is not defined for said first computer language;
indicating an error condition for each item in said plurality of program modules that is not supported by an execution environment of said first computer language; and
indicating an error condition for each item in said plurality of program modules that is defined for said first computer language but used in a manner inconsistent with said first computer language.

2. The method of claim 1 wherein
said program modules comprise class files; and
said validating further comprises:
determining memory usage by summing code and data usage for all of said program modules; and
indicating an error condition when said memory usage exceeds a maximum memory usage.

3. The method of claim 2 wherein said validating further comprises:
reading each method within said class files;
indicating an error when a method declaration is not supported by said first computer language; and
indicating an error when said execution environment does not support an optional feature of said first computer language and said method declaration includes said optional feature.

4. The method of claim 3 wherein said validating further comprises:
indicating an error when a field declaration is not supported by said first computer language; and
indicating an error when said execution environment does not support an optional feature of said first computer language and said field declaration includes said optional feature.

5. The method of claim 4 wherein said validating further comprises:
reading bytecode of each of said methods;
indicating an error when said bytecode uses data types that are not supported by said first computer language;
indicating an error when said bytecode operates on values of types that are not supported by said first computer language;
indicating an error when said execution environment does not support an optional type of said first computer language and said instruction uses said optional type; and
indicating an error when said execution environment does not support an optional type of said first computer language and said instruction operates on at least one value of said optional type.

6. The method of claim 3 wherein said validating further comprises:
generating a data flow for each method within said class files; and
using said data flow to determine whether the potential for overflow exists in an arithmetic intermediate result within a method, said potential for overflow creating a first final result that is semantically different from a second final result, said first final result obtained when said method is executed against said first computer language, said second final result obtained when said method is executed against said second computer language.

7. The method of claim 3 wherein said validating further comprises:

reading at least one class file comprising a package;

indicating an error when the total number of local variables and parameters within each method of each class in said package exceeds a maximum number of variables and parameters;

converting all bytecodes within said method according to said first computer language to create converted bytecodes; and indicating an error when the total number of converted bytecodes exceeds a maximum number of bytecodes.

8. The method of claim 7 wherein said validating further comprises:

indicating an error when the total number of instance fields within each class of said package exceeds a maximum number of instance fields;

indicating an error when the total number of static fields within each class of said package exceeds a maximum number of static fields;

indicating an error when the total number of instance methods within each class of said package exceeds a maximum number of instance methods;

indicating an error when the total number of static methods within each class of said package exceeds a maximum number of static methods; and indicating an error when the total number of superinterfaces of each class or each interface of said package exceeds a maximum number of superinterfaces.

9. The method of claim 8 wherein said validating further comprises:

indicating an error when a public interface extends a package visible interface within said package; and indicating an error when the access visibility of a package default method in a superclass is changed to public or protected in a subclass in within said package.

10. The method of claim 1 wherein said program modules comprise CAP files; and said validating further comprises:

determining memory usage by summing code and data usage for all of said program modules; and indicating an error condition when said memory usage exceeds a maximum memory usage.

11. The method of claim 1 wherein said first computer language is defined for a Java Card™ Virtual Machine; and said second computer language comprises the Java™ language.

12. The method of claim 1 wherein said first computer language is defined for a Java Card™ Virtual Machine; and said second computer language comprises Java™ class files.

13. The method of claim 1, further comprising determining if a potential overflow condition exists.

14. A program storage device readable by a machine, embodying a program of instructions executable by the machine to perform a method for language subset validation, the method comprising:

validating a plurality of program modules comprising a program, each of said program modules including a plurality of bytecodes defined for a first computer language, said first computer language being a hardware-dependent subset of a second computer language, said validating including:

indicating an error condition for each item in said plurality of program modules that is not defined for said first computer language;

indicating an error condition for each item in said plurality of program modules that is not supported by an execution environment of said first computer language; and indicating an error condition for each item in said plurality of program modules that is defined for said first computer language but used in a manner inconsistent with said first computer language.

15. The program storage device of claim 14 wherein said program modules comprise class files; and said validating further comprises:

determining memory usage by summing code and data usage for all of said program modules; and indicating an error condition when said memory usage exceeds a maximum memory usage.

16. The program storage device of claim 15 wherein said validating further comprises:

reading each method within said class files;

indicating an error when a method declaration is not supported by said first computer language; and indicating an error when said execution environment does not support an optional feature of said first computer language and said method declaration includes said optional feature.

17. The program storage device of claim 16 wherein said validating further comprises:

indicating an error when a field declaration is not supported by said first computer language; and indicating an error when said execution environment does not support an optional feature of said first computer language and said field declaration includes said optional feature.

18. The program storage device of claim 17 wherein said validating further comprises:

reading bytecode of each of said methods;

indicating an error when said bytecode uses data types that are not supported by said first computer language;

indicating an error when said bytecode operates on values of types that are not supported by said first computer language;

indicating an error when said execution environment does not support an optional type of said first computer language and said instruction uses said optional type; and indicating an error when said execution environment does not support an optional type of said first computer language and said instruction operates on at least one value of said optional type.

19. The program storage device of claim 16 wherein said validating further comprises:

generating a data flow for each method within said class files; and using said data flow to determine whether the potential for overflow exists in an arithmetic intermediate result within a method, said potential for overflow creating a first final result that is semantically different from a second final result, said first final result obtained when said method is executed against said first computer language, said second final result obtained when said method is executed against said second computer language.

20. The program storage device of claim 16 wherein said validating further comprises:

reading at least one class file comprising a package;

indicating an error when the total number of local variables and parameters within each method of each class in said package exceeds a maximum number of variables and parameters;

converting all bytecodes within said method according to said first computer language to create converted bytecodes; and indicating an error when the total number of converted bytecodes exceeds a maximum number of bytecodes.

21. The program storage device of claim 20 wherein said validating further comprises:

indicating an error when the total number of instance fields within each class of said package exceeds a maximum number of instance fields;

indicating an error when the total number of static fields within each class of said package exceeds a maximum number of static fields;

indicating an error when the total number of instance methods within each class of said package exceeds a maximum number of instance methods;

indicating an error when the total number of static methods within each class of said package exceeds a maximum number of static methods; and indicating an error when the total number of superinterfaces of each class or each interface of said package exceeds a maximum number of superinterfaces.

22. The program storage device of claim 21 wherein said validating further comprises:

indicating an error when a public interface extends a package visible interface within said package; and indicating an error when the access visibility of a package default method in a superclass is changed to public or protected in a subclass in within said package.

23. The program storage device of claim 14 wherein said program modules comprise CAP files; and said validating further comprises:

determining memory usage by summing code and data usage for all of said program modules; and indicating an error condition when said memory usage exceeds a maximum memory usage.

24. The program storage device of claim 14 wherein said first computer language is defined for a Java Card™ Virtual Machine; and said second computer language comprises the Java™ language.

25. The program storage device of claim 14 wherein said first computer language is defined for a Java Card™ Virtual Machine; and said second computer language comprises Java™ class files.

26. The program storage device of claim 14, said method further comprising determining if a potential overflow condition exists.

27. An apparatus for language subset validation, comprising:

means for validating a plurality of program modules comprising a program, each of said program modules including a plurality of bytecodes defined for a first computer language, said first computer language being a hardware-dependent subset of a second computer language, said validating including:

means for indicating an error condition for each item in said plurality of program modules that is not defined for said first computer language;

means for indicating an error condition for each item in said plurality of program modules that is not supported by an execution environment of said first computer language; and means for indicating an error condition for each item in said plurality of program modules that is defined for said first computer language but used in a manner inconsistent with said first computer language.

28. The apparatus of claim 27 wherein said program modules comprise class files; and said validating means further comprises:

means for determining memory usage by summing code and data usage for all of said program modules; and means for indicating an error condition when said memory usage exceeds a maximum memory usage.

29. The apparatus of claim 28 wherein said means for validating further comprises:

means for reading each method within said class files;

means for indicating an error when a method declaration is not supported by said first computer language; and means for indicating an error when said execution environment does not support an optional feature of said first computer language and said method declaration includes said optional feature.

30. The apparatus of claim 29 wherein said means for validating further comprises:

means for indicating an error when a field declaration is not supported by said first computer language; and means for indicating an error when said execution environment does not support an optional feature of said first computer language and said field declaration includes said optional feature.

31. The apparatus of claim 30 wherein said means for validating further comprises:

means for reading bytecode of each of said methods;

means for indicating an error when said bytecode uses data types that are not supported by said first computer language;

means for indicating an error when said bytecode operates on values of types that arc not supported by said first computer language;

means for indicating an error when said execution environment does not support an optional type of said first computer language and said instruction uses said optional type; and means for indicating an error when said execution environment does not support an optional type of said first computer language and said instruction operates on at least one value of said optional type.

32. The apparatus of claim 29 wherein said means for validating further comprises:

means for generating a data flow for each method within said class files; and means for using said data flow to determine whether the potential for overflow exists in an arithmetic intermediate result within a method, said potential for overflow creating a first final result tat is semantically different from a second final result, said first final result obtained when said method is executed against said first computer language, said second final result obtained when said method is executed against said second computer language.

33. The apparatus of claim 29 wherein said means for validating further comprises:

means for reading at least one class file comprising a package;

means for indicating an error when the total number of local variables and parameters within each method of each class in said package exceeds a maximum number of variables and parameters;

means for converting all bytecodes within said method according to said first computer language to create converted bytecodes; and means for indicating an error when the total number of converted bytecodes exceeds a maximum number of bytecodes.

34. The apparatus of claim 33 wherein said means for validating further comprises:

means for indicating an error when the total number of instance fields within each class of said package exceeds a maximum number of instance fields;

means for indicating an error when the total number of static fields within each class of said package exceeds a maximum number of static fields;

means for indicating an error when the total number of instance methods within each class of said package exceeds a maximum number of instance methods;

means for indicating an error when the total number of static methods within each class of said package exceeds a maximum number of static methods; and means for indicating an error when the total number of superinterfaces of each class or each interface of said package exceeds a maximum number of superinterfaces.

35. The apparatus of claim 34 wherein said means for validating further comprises:

means for indicating an error when a public interface extends a package visible interface within said package; and means for indicating an error when the access visibility of a package default method in a superclass is changed to public or protected in a subclass in within said package.

36. The apparatus of claim 27 wherein said program modules comprise CAP files; and said validating means further comprises:

means for determining memory usage by summing code and data usage for all of said program modules; and means for indicating an error condition when said memory usage exceeds a maximum memory usage.

37. The apparatus of claim 27 wherein said first computer language is defined for a Java Card™ Virtual Machine; and said second computer language comprises the Java™ language.

38. The apparatus of claim 27 wherein said first computer language is defined for a Java Card™ Virtual Machine; and said second computer language comprises Java™ class files.

39. The apparatus of claim 27, further comprising means for determining if a potential overflow condition exists.

40. A method for language subset validation, comprising:

validating a plurality of program modules comprising a program, said program modules including a plurality of bytecodes defined for a first computer language, said first computer language being a hardware-dependent subset of a second computer language, said first computer language for use on resource-constrained devices, said second computer language for use on resource-rich devices, said validating comprising:

indicating an error condition for at least one item in said plurality of program modules that is not defined for said first computer language;

indicating an error condition for at least one item in said plurality of program modules that is not supported by an execution environment of said first computer language; and indicating an error condition for at least one item in said plurality of program modules that is defined for said first computer language but used in a manner inconsistent with said first computer language.

41. The method of claim 40 wherein said first computer language supports array data structures having at most one dimension; and said second computer language supports array data structures having one or more dimension.

42. The method of claim 40 wherein said first computer language supports n-bit arithmetic instructions; and said second computer language supports in-bit arithmetic instructions, where m is greater than n.

43. The method of claim 42 wherein n is 16; and m is 32.

44. A method for language subset validation, comprising:

validating a plurality of program modules comprising a program, said program modules including a plurality of bytecodes defined for a first computer language, said first computer language being a hardware-dependent subset of a second computer language, said first computer language for use on Java Card™ technology-enabled devices, said second computer language for use on Java™ technology-enabled devices, said validating comprising:

indicating an error condition for at least one item in said plurality of program modules that is not defined for said first computer language;

indicating an error condition for at least one item in said plurality of program modules that is not supported by an execution environment of said first computer language; and indicating an error condition for at least one item in said plurality of program modules that is defined for said first computer language but used in a manner inconsistent with said first computer language.

45. A program storage device readable by a machine, embodying a program of instructions executable by the machine to perform a method for language subset validation, the method comprising:

validating a plurality of program modules comprising a program, said program modules including a plurality of bytecodes defined for a first computer language, said first computer language being a hardware-dependent subset of a second computer language, said first computer language for use on resource-constrained devices, said second computer language for use on resource-rich devices, said validating comprising:

indicating an error condition for at least one item in said plurality of program modules that is not defined for said first computer language;

indicating an error condition for at least one item in said plurality of program modules that is not supported by an execution environment of said first computer language; and indicating an error condition for at least one item in said plurality of program modules that is defined for said first computer language but used in a manner inconsistent with said first computer language.

46. The program storage device of claim 45 wherein
said first computer language supports array data structures having at most one dimension; and
said second computer language supports array data structures having one or more dimension.

47. The program storage device of claim 45 wherein
said first computer language supports n-bit arithmetic instructions; and
said second computer language supports m-bit arithmetic instructions, where m is greater than n.

48. The program storage device of claim 47 wherein
n is 16; and
m is 32.

49. A program storage device readable by a machine, embodying a program of instructions executable by the machine to perform a method for language subset validation, the method comprising:
validating a plurality of program modules comprising a program, said program modules including a plurality of bytecodes defined for a first computer language, said first computer language being a hardware-dependent subset of a second computer language, said first computer language for use on Java Card™ technology-enabled devices, said second computer language for use on Java™ technology-enabled devices, said validating comprising:
indicating an error condition for at least one item in said plurality of program modules that is not defined for said first computer language;
indicating an error condition for at least one item in said plurality of program modules that is not supported by an execution environment of said first computer language; and
indicating an error condition for at least one item in said plurality of program modules that is defined for said first computer language but used in a manner inconsistent with said first computer language.

50. An apparatus for language subset validation, comprising:
memory means; and
means for validating a plurality of program modules comprising a program, said program modules including a plurality of bytecodes defined for a first computer language, said first computer language being a hardware-dependent subset of a second computer language, said first computer language for use on resource-constrained devices, said second computer language for use on resource-rich devices, said means for validating comprising:
means for indicating an error condition for at least one item in said plurality of program modules that is not defined for said first computer language;
means for indicating an error condition for at least one item in said plurality of program modules that is not supported by an execution environment of said first computer language; and
means for indicating an error condition for at least one item in said plurality of program modules that is defined for said first computer language but used in a manner inconsistent with said first computer language.

51. The apparatus of claim 50 wherein
said first computer language supports array data structures having at most one dimension; and
said second computer language supports array data structures having one or more dimension.

52. The apparatus of claim 50 wherein
said first computer language supports n-bit arithmetic instructions; and
said second computer language supports m-bit arithmetic instructions, where m is greater than n.

53. The apparatus of claim 52 wherein
n is 16; and
m is 32.

54. An apparatus for language subset validation, comprising:
memory means; and
means for validating a plurality of program modules comprising a program, said program modules including a plurality of bytecodes defined for a first computer language, said first computer language being a hardware-dependent subset of a second computer language, said first computer language for use on Java Card™ technology-enabled devices, said second computer language for use on Java™ technology-enabled devices, said validating comprising:
means for indicating an error condition for at least one item in said plurality of program modules that is not defined for said first computer language;
means for indicating an error condition for at least one item in said plurality of program modules that is not supported by an execution environment of said first computer language; and
means for indicating an error condition for at least one item in said plurality of program modules that is defined for said first computer language but used in a manner inconsistent with said first computer language.

55. A method for language subset validation, comprising:
validating a plurality of program modules comprising a program, each of said program modules including a plurality of bytecodes defined for a first computer language defined for a Java Card™ Virtual Machine, said first computer language being a hardware-dependent subset of the Java™ language, said validating including:
indicating an error condition for each item in said plurality of program modules that is not defined for said first computer language;
indicating an error condition for each item in said plurality of program modules that is not supported by an execution environment of said first computer language; and
indicating an error condition for each item in said plurality of program modules that is defined for said first computer language but used in a manner inconsistent with said first computer language.

56. A method for language subset validation, comprising:
validating a plurality of program modules comprising a program, each of said program modules including a plurality of bytecodes defined for a first computer language defined for a Java Card™ Virtual Machine, said first computer language being a hardware-dependent subset of a second computer language comprising Java™ class files, said validating including:
indicating an error condition for each item in said plurality of program modules that is not defined for said first computer language;

indicating an error condition for each item in said plurality of program modules that is not supported by an execution environment of said first computer language; and indicating an error condition for each item in said plurality of program modules that is defined for said first computer language but used in a manner inconsistent with said first computer language.

57. A program storage device readable by a machine, embodying a program of instructions executable by the machine to perform a method for language subset validation, the method comprising:

validating a plurality of program modules comprising a program, each of said program modules including a plurality of bytecodes defined for a first computer language defined for a Java Carcl™ Virtual Machine, said first computer language being a hardware-dependent subset of the Java™ language, said validating including:

indicating an error condition for each item in said plurality of program modules that is not defined for said first computer language;

indicating an error condition for each item in said plurality of program modules that is not supported by an execution environment of said first computer language; and indicating an error condition for each item in said plurality of program modules that is defined for said first computer language but used in a manner inconsistent with said first computer language.

58. A program storage device readable by a machine, embodying a program of instructions executable by the machine to perform a method for language subset validation, the method comprising:

validating a plurality of program modules comprising a program, each of said program modules including a plurality of bytecodes defined for a first computer language defined for a Java Card™ Virtual Machine, said first computer language being a hardware-dependent subset of a second computer language comprising Java™ class files, said validating including:

indicating an error condition for each item in said plurality of program modules that is not defined for said first computer language;

indicating an error condition for each item in said plurality of program modules that is not supported by an execution environment of said first computer language; and indicating an error condition for each item in said plurality of program modules that is defined for said first computer language but used in a manner inconsistent with said first computer language.

59. An apparatus for language subset validation, comprising:

means for validating a plurality of program modules comprising a program, each of said program modules including a plurality of bytecodes defined for a first computer language defined for a Java Card™ Virtual Machine, said first computer language being a hardware-dependent subset of the Java™ language, said validating including:

means for indicating an error condition for each item in said plurality of program modules that is not defined for said first computer language;

means for indicating an error condition for each item in said plurality of program modules that is not supported by an execution environment of said first computer language; and means for indicating an error condition for each item in said plurality of program modules that is defined for said first computer language but used in a manner inconsistent with said first computer language.

60. An apparatus for language subset validation, comprising:

means for validating a plurality of program modules comprising a program, each of said program modules including a plurality of bytecodes defined for a first computer language defined for a Java Card™ Virtual Machine, said first computer language being a hardware-dependent subset of a second computer language comprising Java™ class files, said validating including:

means for indicating an error condition for each item in said plurality of program modules that is not defined for said first computer language;

means for indicating an error condition for each item in said plurality of program modules that is not supported by an execution environment of said first computer language; and means for indicating an error condition for each item in said plurality of program modules that is defined for said first computer language but used in a manner inconsistent with said first computer language.

* * * * *

UNITED STATES PATENT AND TRADEMARK OFFICE
CERTIFICATE OF CORRECTION

PATENT NO.    : 6,581,206 B2
DATED         : June 17, 2003
INVENTOR(S)   : Zhiqun Chen It is certified that error appears in the above-identified patent and that said Letters Patent is hereby corrected as shown below:

Column 7,
Line 32, delete the first occurance of "is".

Column 18,
Line 58, replace "tat" with -- that --.

Column 20,
Line 23, replace "in-bit" with -- m-bit --.

Column 21,
Line 13, replace "in-bit" with -- m-bit --.

Column 23,
Line 16, replace "Carcl$^{TM}$" with -- Card$^{TM}$ --.

Signed and Sealed this

Sixteenth Day of September, 2003

JAMES E. ROGAN
*Director of the United States Patent and Trademark Office*